United States Patent [19]
Wheelock

[11] Patent Number: 6,083,862
[45] Date of Patent: Jul. 4, 2000

[54] CYCLIC PROCESS FOR OXIDATION OF CALCIUM SULFIDE

[75] Inventor: Thomas D. Wheelock, Ames, Iowa

[73] Assignee: Iowa State University Research Foundation, Inc., Ames, Iowa

[21] Appl. No.: 08/903,291

[22] Filed: Jul. 30, 1997

Related U.S. Application Data

[63] Continuation-in-part of application No. 08/468,841, Jun. 6, 1995, Pat. No. 5,653,955, which is a continuation-in-part of application No. 08/209,734, Mar. 14, 1994, Pat. No. 5,433,939.

[51] Int. Cl.⁷ .............................. B01J 20/34; C01B 13/14
[52] U.S. Cl. ................ 502/41; 502/38; 502/49; 502/51; 502/52; 423/638
[58] Field of Search ................. 502/38, 41, 49, 502/51, 52; 423/638

[56] References Cited

U.S. PATENT DOCUMENTS

| | | | |
|---|---|---|---|
| 2,740,691 | 4/1956 | Burwell | 23/181 |
| 3,087,790 | 4/1963 | Wheelock et al. | 23/186 |
| 3,607,045 | 9/1971 | Wheelock et al. | 23/186 |
| 3,729,551 | 4/1973 | Gorin | 423/638 |
| 4,102,989 | 7/1978 | Wheelock | 423/541 |
| 4,216,197 | 8/1980 | Moss | 423/638 |
| 4,255,162 | 3/1981 | Moss | 48/197 |
| 4,854,249 | 8/1989 | Khinkis et al. | 110/342 |
| 4,867,756 | 9/1989 | Patel | 48/197 |
| 5,243,922 | 9/1993 | Rehmat et al. | 110/233 |

FOREIGN PATENT DOCUMENTS

89/05282  6/1989  WIPO .............................. C01F 11/08

*Primary Examiner*—Steven P. Griffin
*Assistant Examiner*—Cynthia M. Donley
*Attorney, Agent, or Firm*—Henderson & Sturm LLP

[57] ABSTRACT

Calcium sulfide particles in mixtures with carbon particles, as in coal gasifier waste, are converted to calcium oxide by repeated cycles of oxidation and reduction by utilizing the carbon as a source of the reducing gas required for the treatment. The treatment can be conducted in a two zone fluidized bed reactor by limiting the amount and concentration of oxygen supplied to a lower reducing zone and by supplying excess oxygen to an upper oxidizing zone. Alternatively, for particles less than 0.5 mm in size, the treatment can be conducted by utilizing either two transport reactors or two circulating fluidized bed reactors in series whereby the first reactor in the series is maintained in a reducing state and the second reactor is maintained in an oxidizing state. The particles are transported sequentially through both reactors and recycled several times. The amount and concentration of oxygen supplied to the first reactor is limited to create reducing conditions, while excess oxygen is supplied to the second reactor to create oxidizing conditions.

23 Claims, 16 Drawing Sheets

Fig. 2 Typical results of thermogravimetric analysis

Fixed bed reactor system during Oxidation phase

Fixed bed reactor system during Reducing phase

CYCLIC PROCESS FOR OXIDATION OF CALCIUM SULFIDE

CROSS-REFERENCE TO RELATED APPLICATIONS

This application is a continuation-in-part of Ser. No. 08/468,841, filed Jun 6, 1995, now U.S. Pat. No. 5,653,955, which is a continuation-in-part of Ser. No. 08/209,734, filed Mar. 14, 1994, now U.S. Pat. No. 5,433,939, the disclosures of which are incorporated in their entirety by reference thereto herein, by Thomas D. Wheelock for an invention entitled "Cyclic Process of Oxidation of Calcium Sulfide".

STATEMENT REGARDING FEDERALLY SPONSORED RESEARCH OR DEVELOPMENT

Not Applicable.

AUTHORIZATION PURSUANT TO 37 C.F.R. §1.71(d)(e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

In general, this invention relates to chemical processes, and more particularly to a process for oxidizing calcium sulfide. Specifically, the present invention is directed to oxidizing calcium sulfide in waste solids in particulate form, and more specifically to treating coal gasifier wastes.

2. Description of the Related Art

The numbers in brackets below refer to references listed in the Appendix, the teachings of which are hereby incorporated by reference.

The U.S. Department of Energy (DOE) is sponsoring the development of several different types of integrated coal gasification, combined-cycle (IGCC) systems for generating electric power more efficiently than can be accomplished with present power generation systems [1]. An important feature of an IGCC system is the direct utilization of the hot gasifier product as a gas turbine fuel. By not cooling the gas between the gasifier and turbine, the overall thermal efficiency of the system is greater than it would be otherwise. However, the hot gas must be cleaned to remove coal ash and sulfur compounds before it is utilized as a turbine fuel. Several types of hot gas filters are being developed to remove ash. In the IGCC systems under development the hot gas will be contacted with a solid adsorbent which will remove the sulfur compounds. Although various materials can be used for adsorbing sulfur compounds at high temperature, lime is one of the more suitable materials, and it is readily available and low in cost. In some systems under development which employ fluidized bed gasifiers, lime can be supplied to the gasifiers where it reacts directly with sulfur compounds released during coal gasification. In systems which employ other types of gasifiers it is more appropriate to utilize the sorbent in a separate gas contacting device interposed between the gasifier and the gas turbine. Either fixed bed, moving bed, or fluidized bed absorbers can be used for this purpose. The fixed bed and moving bed absorbers would utilize sorbent particles which are considerably larger than those used in a fluidized bed adsorber.

Regardless of the gas contacting method, the reaction of lime with sulfur compounds such as hydrogen sulfide in coal gas converts the lime to calcium sulfide. Since calcium sulfide cannot be placed directly in a landfill where it would react slowly with moisture to release toxic hydrogen sulfide gas, the utilization of lime as a sorbent for sulfur compounds requires the application of a suitable process for converting calcium sulfide back to calcium oxide for either reuse or disposal.

Previous investigations have shown that the conversion of calcium sulfide to calcium oxide by oxidation with air or other oxygen-containing mixtures at high temperature is not straightforward. When a previous attempt was made to oxidize calcium sulfide particles with a gas mixture containing 6 mol % oxygen at a temperature between 650 and 980° C., some of the calcium sulfide was converted to calcium sulfate and the reaction virtually ceased, leaving a large amount of calcium sulfide unreacted [2]. Apparently, calcium sulfate plugged the particle pores because the molar volume of calcium sulfate is 1.9 times that of calcium sulfide. Consequently, the oxidation treatment left individual particles with an unreacted core of calcium sulfide surrounded by an impenetrable shell of calcium sulfate. Other investigations [3,4] showed that the oxidation of calcium sulfide with oxygen-containing mixtures at temperatures in the range of 1000° C. to 1350° C. produced particles containing both calcium sulfate and calcium oxide. Only by conducting oxidation at 1450° C. to 1550° C. was it possible to achieve a high conversion of calcium sulfide to calcium oxide in a reasonable time [5]. Unfortunately, such temperatures are not achieved easily, and the lime would probably be dead burned and unreactive so that it could not be recycled.

To circumvent some of these difficulties, Moss [6,7] conceived a process for converting calcium sulfide into calcium oxide in which particles containing a small amount of calcium sulfide are subjected first to oxidation and then to reduction at 1050 to 1090° C. By treating the particles with an oxidizing gas, at least part of the calcium sulfide is converted to calcium sulfate, and then, when the particles are treated with a reducing gas, the calcium sulfate is converted to calcium oxide. This process is designed to regenerate lime employed in a fuel desulfurization process which involved contacting the fuel with hot lime particles in a fluidized bed reactor. The lime is converted to calcium sulfide which is then treated in an adjoining fluidized bed to regenerate the lime. The solids circulate continuously back and forth between the two fluidized beds. One of the most significant features of this process is that the conversion of calcium sulfide in each pass is low. Moss indicated that particles containing no more an 10 mol % calcium sulfide are preferred. Consequently, a large particle recirculation rate between the two fluidized beds is required to convey a given amount of sulfur from the fuel desulfurization bed to the calcium oxide regenerator. For this application it is not necessary for all or even most of the calcium sulfide to be converted to calcium oxide in any given pass through the regenerator.

The Moss process is unsuitable for treating particles with a large concentration of calcium sulfide because only a small fraction of the calcium sulfide would be converted to calcium oxide in passing through the fluidized bed regenerator described by Moss [6,7]. With his system, only an outer layer of calcium sulfide would be oxidized to calcium sulfate and subsequently reduced to calcium oxide which would leave most of the calcium sulfide intact. Therefore, the Moss process is not suitable for treating coal gasifier waste containing a high level of calcium sulfide or for regenerating a lime-based sorbent containing a large concentration of calcium sulfide. Of course, the larger the sorbent particles, the smaller the fraction of calcium sulfide converted and the poorer the performance of the process. Furthermore, the Moss process cannot be used for treating particles which are too large to be fluidized.

In some types of coal gasifiers, lime or limestone particles are introduced directly into the gasifiers to capture sulfur emitted during the gasification process. An example of this type of gasifier is the Kellogg-Rust-Westinghouse (KRW) air-blown, pressurized, fluidized bed coal gasification system [1,8]. In this system crushed coal and limestone particles are fed to the gasifier along with air and steam, and a low-Btu gas is produced which is suitable as a gas turbine fuel. The waste solids from the gasifier are a mixture of coal char, coal ash, calcium oxide, and calcium sulfide. An initial demonstration plant based on this technology has been built in the western United States, and it is capable of processing 880 tons/day of bituminous coal to produce electric power. Although the gasifier is capable of operating on a wide variety of coals, a low-sulfur western U.S. coal with only 0.4 wt. % sulfur was selected as a basis for process design. For the designed operating conditions (1800° F., 295 psia, 4:1 mole ratio of Ca:S), it is estimated that approximately half of the coal sulfur will be captured as calcium sulfide in the gasifier. The projected composition of the gasifier waste solids includes the following components: 21 wt. % unburned carbon, 56 wt. % coal ash, 16 wt. % calcium oxide, and 2.7 wt. % calcium sulfide. This material can not be placed directly in a landfill because of the presence of unburned carbon and calcium sulfide. The initial demonstration plant will subject the gasifier waste to high temperature (1600° F.) oxidation with air in a fluidized bed reactor to eliminate the carbon and convert part of the calcium sulfide to calcium sulfate. Unfortunately, much of the calcium sulfide may not be converted because particle pores will become blocked with calcium sulfate as calcium sulfide particles are oxidized. Therefore, it remains to be seen whether the treated waste can be disposed without violating environmental standards.

If a coal with a higher sulfur content is used, which is quite likely in the future when other gasification plants are built, the calcium sulfide content of the waste will be much greater, exacerbating the problem of waste disposal. A much more effective method of treating the gasifier waste, therefore, is to use the cyclic oxidation and reduction process disclosed herein and claimed in commonly owned in U.S. Pat. No. 5,433,939 and in U.S. Pat. No. 5,653,955 as further identified as related applications.

As used herein "coal gasifier waste" includes coal gasifier waste comprising calcium sulfide, and preferably coal gasifier waste comprising calcium sulfide and at lest one member selected from the group consisting of coal ash, coal char, and unreacted lime in addition to calcium sulfide. In accordance with the present invention, coal gasifier waste most preferably comprises calcium sulfide and a source of carbon, such as coal char.

The application of such processes to gasifier waste containing both unburned carbon and calcium sulfide as illustrated by the disclosure and examples herein has been discovered to be particularly advantageous for oxidizing calcium sulfide present in such waste solids.

Those concerned with these and other problems recognize the need for an improved process for oxidizing calcium sulfide.

BRIEF SUMMARY OF THE INVENTION

The present invention provides an improved process for converting particles containing calcium sulfide into calcium oxide by subjecting the particles to repeated cycles of oxidation and reduction. The impenetrable layer of calcium sulfate which forms during the oxidation phase of each cycle is destroyed by the subsequent reducing phase. By repeating the cycle many times, the particles are converted completely into calcium oxide at a reasonable temperature of about 1000° C. The process can be carried out in either fixed bed, moving bed, or fluidized bed reactors by varying the composition of the gas supplied to the reactors in a periodic manner. Alternatively, the process can be conducted in fluidized bed reactors which have separate oxidizing and reducing zones located one above the other. In one design air is supplied through a gas distributor at the bottom of the fluidized bed to create an oxidizing zone in the lower part of the bed. A reducing gas is introduced through a second distribution grid located in the mid-region of the bed to create a reducing zone in the upper part of the bed. In another design, the zones are reversed by introducing a reducing gas through the lower gas distributor and an oxidizing gas through the upper distributor. The upper gas distributor is in the form of an open grid of tubing which does not interfere with particle circulation in the fluidized bed. As the particles circulate freely within the bed, they pass through the different zones many times to be repeatedly oxidized and reduced.

Particle mixtures containing both calcium sulfide and carbon, as in some types of coal gasifier waste, can be treated similarly by utilizing the carbon as a source of reducing gas generated by reacting the carbon with a limited supply of oxygen. In accordance with the present invention, the treatment of particle mixtures comprising calcium sulfide and particles comprising carbon, can be carried out in a two zone fluidized bed reactor which supplies a limited amount of oxygen in a limited concentration to the lower zone to establish reducing conditions and supplies excess oxygen to the upper zone to establish oxidizing conditions.

Alternatively, the treatment can be conducted in a series of two transport reactors or two circulating fluidized bed reactors wherein one reactor is maintained in a reducing state and the other reactor is maintained in an oxidizing state. The particles are recycled several times so as to subject them to repeated cycles of oxidation and reduction. With any of these methods of applying the cyclic treatment, the principal reaction which takes place during oxidation is the following highly exothermic reaction:

$$CaS + 2O_2 = CaSO_4 \tag{1}$$

When the particles are treated subsequently by a reducing gas such as CO, $H_2$, or $CH_4$, the principal reaction which takes place is one of the following endothermic reactions depending on the reducing gas employed:

$$CaSO_4 + CO = CaO + CO_2 + SO_2 \tag{2}$$

$$CaSO_4 + H_2 = CaO + H_2O + SO_2 \tag{3}$$

$$CaSO_4 + \frac{1}{4}CH_4 = CaO + \frac{1}{4}CO_2 + \frac{1}{2}H_2O + SO_2 \tag{4}$$

After numerous cycles of oxidation and reduction, the particles will appear to have undergone one of the overall reactions shown below again depending on which reducing gas is employed.

$$CaS + 2O_2 + CO = CaO_2 + SO_2 \quad (5)$$

$$CaS + 2O_2 + H_2 = CaO_2 + H_2O + SO_2 \quad (6)$$

$$CaS + 2O_2 + \frac{1}{4}CH_4 = CaO + \frac{1}{4}CO_2 + \frac{1}{2}H_2O + SO_2 \quad (7)$$

Thus, it can be seen that overall the conversion of one mole of calcium sulfide to calcium oxide requires two moles of oxygen and one mole of either carbon monoxide or hydrogen or 0.25 mole of methane. Other reducing gases such as ethane or propane can also be employed. It is noteworthy that reactions 5, 6, and 7 are exothermic reactions.

Methods similar to the ones described above for conducting a cyclic process in a fluidized bed reactor have been demonstrated with large bench-scale systems applied to the reductive decomposition of calcium sulfate [9, 10, 11, 12]. Since this is an endothermic process, heat is supplied by partial combustion of a hydrocarbon fuel such as natural gas within the fluidized bed where calcium sulfate is decomposed. Partial combustion of a fuel-rich mixture of fuel and air generates carbon monoxide and hydrogen which then react with calcium sulfate mainly according to reactions 2 and 3. However, some calcium sulfate is reduced to calcium sulfide by the following reactions:

$$CaSO_4 + 4CO = CaS + 4CO_2 \quad (8)$$

$$CaSO_4 + 4H_2 = CaS + 4H_2O \quad (9)$$

In order to eliminate the calcium sulfide produced by these reactions, the particles are treated subsequently with an oxidizing gas which results in reaction 1 and the following reaction taking place simultaneously:

$$CaS + \frac{3}{2}O_2 = CaO + SO_2 \quad (10)$$

However, reaction 1 produces calcium sulfate which can only be decomposed by further exposure to a reducing gas. Thus, it has proved effective to employ a cyclic process in which the particles are treated alternately and repeatedly to oxidation and reduction. One method of conducting the cyclic process is to establish separate oxidizing and reducing zones within the same fluidized bed by controlling the air to fuel ratio supplied to the different zones. For example, a fuel-rich mixture of air and natural gas is supplied to the bottom of the bed creating a reducing zone in the lower part of the bed, and excess secondary air is supplied higher up in the bed creating an oxidizing zone in the upper part of the bed. A second method of conducting the cyclic process involves varying in a periodic manner the composition of the entire gas phase within the bed by controlling the overall air to fuel ratio supplied to the reactor. During one part of each cycle a fuel-rich mixture of air and natural gas is supplied to the reactor, while during another part of the cycle only air is supplied.

Although the present methods for converting calcium sulfide to calcium oxide appear similar to the methods which were demonstrated previously for converting calcium sulfate to calcium oxide, the two processes serve entirely different purposes and differ in implementation. The conversion of calcium sulfide to calcium oxide is a two-step process which has to be conducted by means of a series of short oxidation and reduction steps. Calcium sulfate is an unavoidable intermediate formed by the first step and destroyed by the second step. Since the overall conversion of calcium sulfide to calcium oxide is an exothermic process, heat has to be removed by some means such as by spraying water into the fluidized bed or by cooling the reactor walls. The overall required amounts of oxygen and reducing gas are determined by the stoichiometric requirements of reactions such as 5, 6, and 7.

The previously developed cyclic process, which is designed for converting calcium sulfate into calcium oxide, is a one-step process. The formation of calcium sulfide is incidental. Calcium sulfide is formed by a side reaction and is never present in more than small amounts. The oxidation step in the cycle serves the purpose of eliminating this undesirable by-product. Since the conversion of calcium sulfate into calcium oxide is an endothermic process, heat has to be supplied by the combustion of fuel within the fluidized bed. The fuel requirements for the reductive decomposition of calcium sulfate via reactions such as 2, 3, and 4 are relatively large both because of the heat absorbed by the reactions and the participation of reducing gases in the reactions. Previous material and energy balance calculations have shown that if methane is employed as a fuel and source of reductants, between 0.65 and 1.66 mole $CH_4$/mole $CaSO_4$ is required depending on the reaction temperature and thermal efficiency of the process [9]. The quantity of methane is much greater than the 0.25 mole $CH_4$/mole CaS required for the conversion of calcium sulfide to calcium oxide by the present two-step process. Air requirements for the two processes also differ substantially. Therefore, it can be seen that the two processes require conditions which differ significantly.

BRIEF DESCRIPTION OF THE SEVERAL VIEWS OF THE DRAWINGS

These and other attributes of the invention will become clearer upon a thorough study of the following description of the best mode for carrying out the invention, particularly when reviewed in conjunction with the examples and drawings wherein:

FIG. 13$b$ is a flow sheet showing a fixed bed reactor system during the reducing phase.

DETAILED DESCRIPTION OF THE INVENTION

Figure 1:
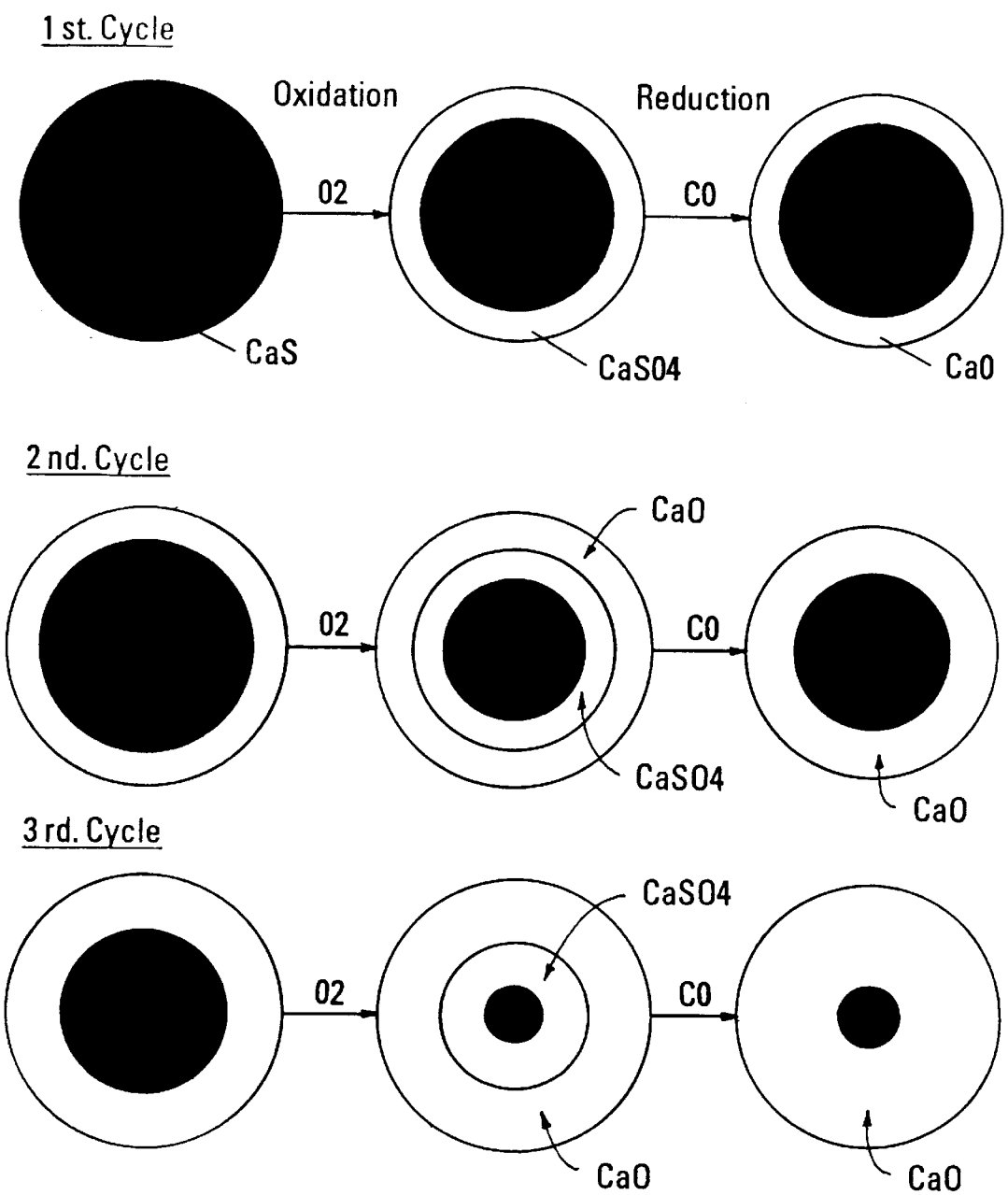
FIG. 1 is a schematic diagram of a single particle of CaS that is converted one layer at a time to $CaSO_4$ and then to CaO by alternately treating it with an oxidizing gas and then with a reducing gas.

The present process described herein overcomes the shortcomings of the Moss process by subjecting particles containing calcium sulfide to repeated cycles of oxidation and reduction. The impenetrable layer of calcium sulfide which forms during the oxidation phase of each cycle is destroyed by the subsequent reducing phase. In this way each particle of calcium sulfide is converted one layer at a time to calcium sulfate and then to calcium oxide by alternately treating it with an oxidizing gas and then with a reducing gas. A schematic representation of the process applied to a single particle is indicated by FIG. 1.

In commercial applications, the process can be carried out in either fixed bed, moving bed, or fluidized bed reactors, as well as gas transport reactors. With any of these reactors the solid particles undergoing treatment can be subjected to repeated cycles of oxidation and reduction by varying the composition of the gas supplied to the reactor in a periodic manner. During the oxidizing phase of each cycle an oxidizing gas such as air is supplied and during the reducing phase a reducing gas such as natural gas is supplied. By an appropriate selection of reactor type, it becomes possible to treat particles of various sizes containing almost any concentration of calcium sulfide and achieve nearly complete conversion of calcium sulfide to calcium oxide.

In accordance with embodiments of the present invention wherein fluidized bed reactors are employed for this process, there is an alternative method for treating particles to repeated cycles of oxidation and reduction. The method is based on maintaining separate oxidizing and reducing zones, one above the other, within the same fluidized bed. As the particles circulate freely within the bed, they are treated repeatedly to oxidation and reduction. This treatment is in marked contrast to that proposed by Moss which employs a fluidized bed with adjacent oxidizing and reducing zones but particle circulation between the zones is inhibited by a vertical baffle between the zones. The Moss method is designed to oxidize the particles in a single step and then reduce the particles in a second single step while avoiding backmixing and a repetition of the steps.

In accordance with embodiments of the present invention wherein calcium sulfide particles are mixed with carbon particles, as in some type of coal gasifier waste, the method of treatment is modified in order to utilize the carbon as a source of reducing gas required for the process. As used herein, "coal gasifier waste" includes coal gasifier waste which contains calcium sulfide, and preferably coal gasifier waste comprising calcium sulfide and a source of carbon, such as coal char. In accordance with the present invention, coal gasifier waste may also comprise at least one member selected from the group consisting of coal ash, coal char, and unreacted lime in addition to calcium sulfide.

The treatment of coal gasifier waste in accordance with the present invention can be conducted in a fluidized bed reactor as described above by supplying a limited amount of oxygen in a limited concentration to the lower part of the fluidized bed to create a lower reducing zone. With excess carbon present, the reaction of carbon and oxygen produces carbon monoxide required for the reductive decomposition of calcium sulfate. In addition, excess oxygen is introduced in the middle of the fluidized bed to create an upper oxidizing zone wherein calcium sulfide is converted to calcium sulfate. Again, as the particles containing calcium sulfide circulate freely between the two zones, they are subjected to repeated cycles of oxidation and reduction.

In accordance with this embodiment of the present invention, the process for oxidizing calcium sulfide comprises the steps of exposing particles comprising calcium sulfide and a source of carbon in a fluidized bed reactor having an upper part, a lower part, a middle part, and a bottom, to a treatment cycle conducted at a temperature within a temperature range of at least about 900° C. and preferably up to about 1200° C. by circulating the particles freely between the lower part of the fluidized bed reactor maintained in a reducing state and the upper part of the fluidized bed reactor maintained in an oxidizing state so that the particles are treated repeatedly to oxidation and reduction; creating reducing conditions for the reducing state in the lower part of the fluidized bed reactor by supplying oxygen in a fluidizing gas to the bottom of the fluidized bed reactor in an amount less than about 50% of the stoichiometric amount required for complete combustion of the carbon in feed particles comprising calcium sulfide and carbon wherein the concentration of oxygen in the fluidizing gas is less than about 10 vol. %; and creating oxidizing conditions for the oxidizing state in the upper part of the fluidized bed reactor by introducing additional air in the middle of the fluidized bed reactor in a sufficient amount such that oxygen supplied to the fluidized bed reactor exceeds both a stoichiometric amount required for complete combustion of the carbon in the feed particles and an amount required for complete conversion of calcium sulfide to calcium oxide and sulfur dioxide.

In accordance with the present invention, the fluidizing gas supplied to the bottom of the fluidized bed reactor comprises a mixture of air and steam, or a mixture of air and recycled reactor off-gas after the off-gas has been treated to remove sulfur dioxide.

For the purposes of the present invention, the fluidized bed reactor comprises a two-zone fluidized bed reactor.

Alternatively, mixtures of fine-size particles, preferably having a particle size of less than about 0.5 mm, of calcium sulfide and carbon can be treated in a series of two transport reactors or two circulating fluidized bed reactors wherein one reactor in the series is maintained in a reducing state and the other reactor is maintained in an oxidizing state and the particles pass from one reactor to the next and are recycled from the second reactor back to the first reactor several times before leaving the reaction system. In this embodiment of the present invention, the particles are also subjected to repeated cycles of oxidation and reduction. The reactor maintained in a reducing state is supplied with a limited amount of oxygen in a limited concentration, whereas the reactor maintained in an oxidizing state is supplied with excess oxygen.

In this embodiment of the present invention, the process for oxidizing calcium sulfide comprises the steps of exposing particles comprising calcium sulfide and carbon to a treatment cycle conducted at a temperature of at least about 900° C. in a reaction system comprising a first chemical reactor and a second chemical reactor in series, wherein the first chemical reactor is maintained in a reducing state and the second chemical reactor is maintained in an oxidizing state by introducing feed particles comprising calcium sulfide and carbon into the first chemical reactor and, after treatment in the first chemical reactor, passing treated particles to the second chemical reactor and, after treatment in the second chemical reactor, returning subsequently treated particles to the first reactor for further treatment; and repeating said treatment cycle at least two times before the particles are removed from the reaction system. Reducing conditions are created in the first chemical reactor by supplying the first chemical reactor with air in such an amount that oxygen is supplied in a quantity of less than about 50% of a stoichiometric amount required for complete combustion of the carbon in the feed particles; and oxidizing conditions are created in the second chemical reactor by supplying the second chemical reactor with air in an amount such that a sum of an amount of oxygen supplied to the first chemical reactor and an amount of oxygen supplied to the second chemical reactor exceeds both a stoichiometric amount of oxygen required for complete oxidation of the carbon in the feed particles and an amount of oxygen required for complete conversion of calcium sulfide in the feed particles to calcium oxide and sulfur dioxide.

For this embodiment of the present invention, the reaction system comprises either two transport reactors or two circulating fluidized bed reactors in series, wherein said first chemical reactor comprises either a first transport reactor or a first circulating fluidized bed reactor, and said second chemical reactor comprises either a second transport reactor or a second circulating fluidized bed reactor.

For the purposes of the present invention, the particles comprise waste solids produced by coal gasification. In addition to calcium sulfide, coal gasifier waste solids also comprise a source of carbon, such as coal char. Coal gasifier waste solids comprising carbon are also referred to herein as carbonaceous particles and carbon particles. For the purposes of the present invention, the particles also preferably comprise at least one member selected from the group consisting of coal ash and unreacted lime. Most preferably, for the purposes of the present invention, particles comprise calcium sulfide, coal char, coal ash, and unreacted lime.

In accordance with the present invention, the particles preferably are in a particle mixture comprising calcium sulfide particles and carbon particles.

In accordance with the present invention, the particles preferably have a size of less than about 5.0 mm, and most preferably have a size within the range of about 0.2 mm to about 5.0 mm for treatment in a fluidized bed reactor. Particles smaller than 0.5 mm in size are treated preferably in either transport reactors or circulating fluidized bed reactors.

In accordance with the present invention, the temperature of the treatment cycle is within a range of about 900° C. to about 1200° C.

The following examples are illustrative of the best mode for carrying out the invention. They are obviously not to be construed as limitative of the invention since various other embodiments can readily be evolved in view of the teachings provided herein.

EXAMPLE I

Methods of converting calcium sulfide to either calcium oxide or calcium sulfate using different techniques were investigated since these two products are much more suitable for direct disposal.

The oxidation of calcium sulfide was done using a Thermogravimetric Analysis apparatus (TGA).

Among the different techniques used, the most promising was a series of experiments involving the cyclic oxidation and reduction of pure calcium sulfide pellets in the TGA apparatus. A pellet was placed in a basket and put into the TGA apparatus.

The TGA apparatus consisted of a quartz reactor tube about 1 meter in length surrounded by an insulated electric furnace which could heat up to about 1200° C.

A CAHN 2000 electrobalance was used to give continuous readings of the mass of the sample during experiments. These readings were recorded on a chart recorder. The samples were placed in either a quartz basket or on a quartz pan and were hung from a loop on the electrobalance.

The gases were fed into the top of the quartz tube and also some nitrogen was fed into the electrobalance casing to stop any other gases from entering it. The gas mixture was regulated using a series of rotameters.

The temperature in the furnace was regulated manually using a thermocouple to measure reactor temperature, and it was possible to keep the temperature within 10° C. of the desired temperature.

The electrobalance was calibrated every 3 or 4 experiments or whenever the sample holder was changed or replaced.

For the oxidation phase of the cycle, 10% oxygen was used for most experiments. For the reduction phase of the cycle, either 20% natural gas or 5% carbon monoxide was used. The time for oxidation and reduction varied from one minute for each phase to a longer time where the oxidation and reduction were allowed to go to completion.

The other variable for these experiments was the temperature and this ranged from 900 to 1100° C.

Due to the fact that the exit gas stream could not be analyzed, the final composition of the sample was not known and therefore a few reacted and partially reacted samples were sent for X-ray diffraction analysis.

Figure 2:
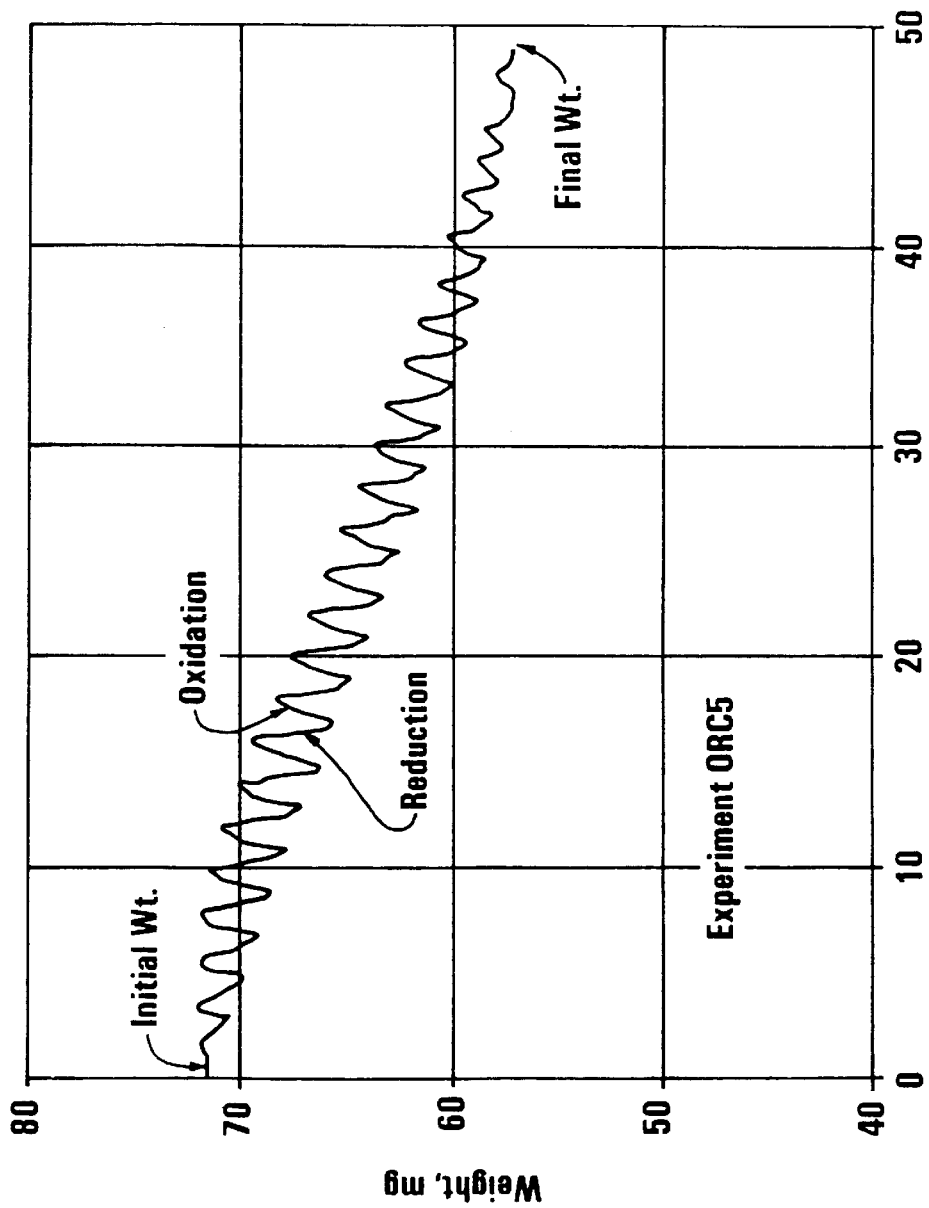
FIG. 2 is a chart from the chart recorder connected to a Thermogravimetric Analysis (TGA) apparatus showing sample weight changes which occurred during the oxidation of CaS by the cyclic process.

FIG. 2 shows a typical result achieved using this method.

The set of experimental data given in TABLE 1 shows different operating conditions and results. In these experiments the aim was to convert the sulfide to the oxide. The results show that the conversion was quicker at higher temperatures but that the conversion obtained varied fairly widely.

during the oxidation phase of the cycle, the particles were treated with a gas mixture containing 10% by volume oxygen and during the reducing phase the particles were treated with a gas containing 5% by volume carbon monoxide. By using a 2 minute cycle and a total treatment time of 44 minutes, a conversion of 97% was achieved at 1100° C. starting with a 72 mg pellet and using conventional TGA equipment. When a similar pellet of calcium sulfide was subjected to oxidation alone under similar conditions, almost no reaction took place.

The results of such experiments indicate that during the oxidation phase of the cycle the principal reaction taking place is the following:

$$CaS + 2O_2 = CaSO_4 \tag{1}$$

Since the calcium sulfate occupies a greater volume than the calcium oxide, it blocks the pores in the particle and forms

TABLE 1

Cyclic oxidation of CaS Pellets using 10% oxygen and 20% natural gas or 5% carbon monoxide

| EXPERIMENT NO. | TEMP. ° C. | INITIAL Wt. mg. | FINAL Wt. mg. | WEIGHT LOSS mg. | TIME mins. | CONVERSION % | CYCLE RATIO Oxid. min/Red. min |
|---|---|---|---|---|---|---|---|
| CYCLIC OXIDATION AND REDUCTION USING OXYGEN AND NATURAL GAS ||||||||
| ORM 1 | 1050 | 92 | 71 | 21 | 116 | 100 | 5:1 |
| ORM 2 | 950 | 76 | 60 | 16 | 135 | 93 | 1:1 |
| ORM 3 | 1050 | 81 | 66 | 15 | 72 | 81 | 1:1 |
| ORM 4 | 1100 | 91 | 72 | 19 | 60 | 92 | 1:1 |
| ORM 5 | 1050 | 67 | 54 | 13 | 76 | 87 | 1:1 |
| ORM 6* | 1050 | 74 | 60 | 14 | 74 | 86 | 1:1 |
| ORM 7 | 1050 | 68 | 52 | 16 | 64 | 103 | 2:1 |
| ORM 8 | 1050 | 82 | 66 | 16 | 100 | 86 | 2:1 |
| ORM 9 | 1100 | 70 | 57 | 13 | 40 | 81 | 1:1 |
| CYCLIC OXIDATION AND REDUCTION USING OXYGEN AND CARBON MONOXIDE ||||||||
| ORC 1 | 1050 | 70 | 57 | 13 | 60 | 81 | 1:1 |
| ORC 2 | 1050 | 67 | 57 | 10 | 44 | 67 | 1:1 |
| ORC 3 | 950 | 64 | 54 | 10 | 80 | 71 | 1:1 |
| ORC 4 | 1050 | 69 | 56 | 13 | 56 | 83 | 1:1 |
| ORC 5 | 1100 | 72 | 56 | 16 | 44 | 97 | 1:1 |
| ORC 6 | 1050 | 70 | 57 | 13 | 78 | 81 | 2:1 |
| ORC 7 | 1100 | 65 | 50 | 15 | 72 | 102 | VARIED |
| ORC 8 | 1050 | 60 | 47 | 13 | 104 | 100 | 4:4 |
| ORC 9 | 900 | 97 | 84 | 13 | 160 | 62 | VARIED |
| ORC 10 | 950 | 56 | 49 | 7 | 220 | 58 | VARIED |
| ORC 11 | 1050 | 62 | 49 | 13 | 160 | 93 | VARIED |

*20% oxygen was used for experiment ORM 6.

The solids recovered following experiments ORC 5 and ORM 3 in which calcium sulfide had undergone cyclic oxidation and reduction were subjected to X-ray diffraction analysis. This analysis confirmed the almost complete oxidation of calcium sulfide to calcium oxide. While the product contained a large amount of calcium hydroxide when analyzed, the calcium hydroxide was the result of exposing the material to air before it was analyzed. Consequently the calcium oxide reacted with moisture in the air to form calcium hydroxide. Therefore, the analysis showed the product of experiment ORC 5 to be essentially all calcium hydroxide and the product of experiment ORM 3 to be largely calcium oxide with a considerable amount of calcium hydroxide and a small amount of calcium sulfide.

By reference to Table 1, it can be seen that particles or pellets of calcium sulfide can be converted rapidly and almost completely to calcium oxide by a cyclic process which exposes the material alternatively to oxidation and reduction at 900 to 1100° C. In experiment number ORC 5, an impenetrable layer. When the particle is subsequently treated with a reducing gas such as carbon monoxide, the following reaction occurs:

$$CaSO_4 + CO = CaO + CO_2 + SO_2 \tag{2}$$

These reactions can be observed by measuring the change in weight of the particle, since the first reaction produces an increase in weight, whereas the second reaction produces a decrease in weight. For each cycle there is an overall decrease in weight, and these changes become readily apparent by employing thermogravimetric analysis (TGA). Preliminary experiments indicate that a number of cycles are required to convert a particle of calcium sulfide completely to calcium oxide. The evidence suggests that the conversion of calcium sulfide into calcium oxide follows a shrinking, unreacted core process where the unreacted core of calcium sulfide gradually recedes and the surrounding shell of calcium oxide gradually becomes thicker with each cycle.

EXAMPLE II

Further experiments were conducted with the TGA apparatus described above to determine the effects of gas composition and temperature on the overall rate of conversion of calcium sulfide to calcium oxide by the cyclic oxidation and reduction process. Again single pellets of pure calcium sulfide were treated in the apparatus to oxidizing and reducing gas mixtures under carefully controlled conditions, and the progress of the reactions was observed by recording the weight of the pellet continuously. A 2 min. cycle time was employed with 1 min. devoted to oxidation and 1 min. to reduction. Temperature, oxygen concentration, and the type of reducing gas and its concentration were varied among different runs. The conversion of calcium sulfide to calcium oxide was determined throughout each run from the loss in weight of the reacting pellet. The results of this series of runs are reproduced in FIGS. 3 to 7. In each of these figures the conversion is plotted against reaction time. Therefore, the slope of the resulting curve is a measure of the overall rate of conversion.

Figure 3:
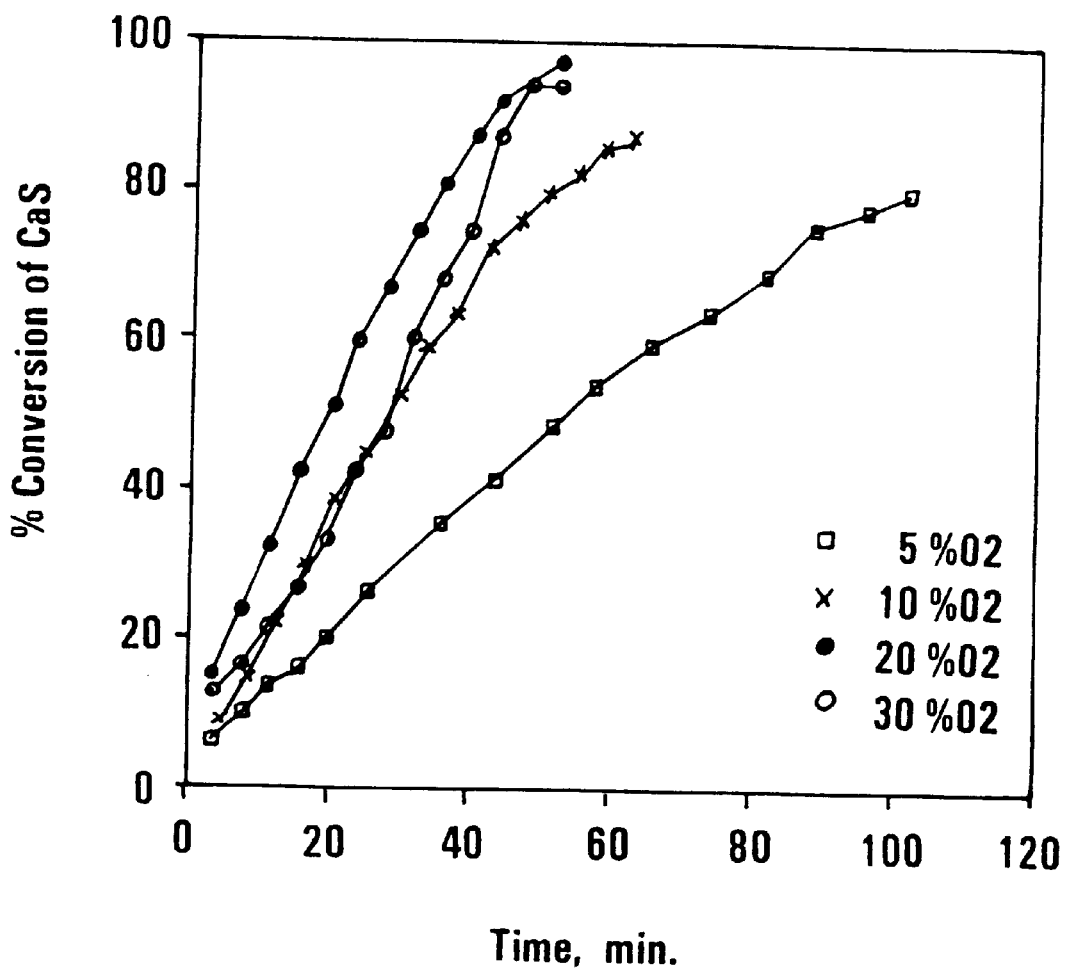
FIG. 3 is a graph of the data obtained in a series of TGA runs in which a pellet of calcium sulfide was treated by the cyclic process at 1050° C. using various oxygen concentrations and a carbon monoxide concentration of 30 mole %.

To investigate the effect of gas composition on the rate of conversion, a reaction temperature of 1050° C. was employed. FIG. 3 shows how the overall rate of conversion of calcium sulfide was affected by oxygen concentration during the oxidizing phase of each cycle. Carbon monoxide in 30 mole % concentration was the reducing gas employed during the reducing phase. It can be seen that the greatest overall rate of conversion was achieved with 20 mole % oxygen. With either higher or lower oxygen concentrations, the overall rate of conversion was lower.

Figure 4:
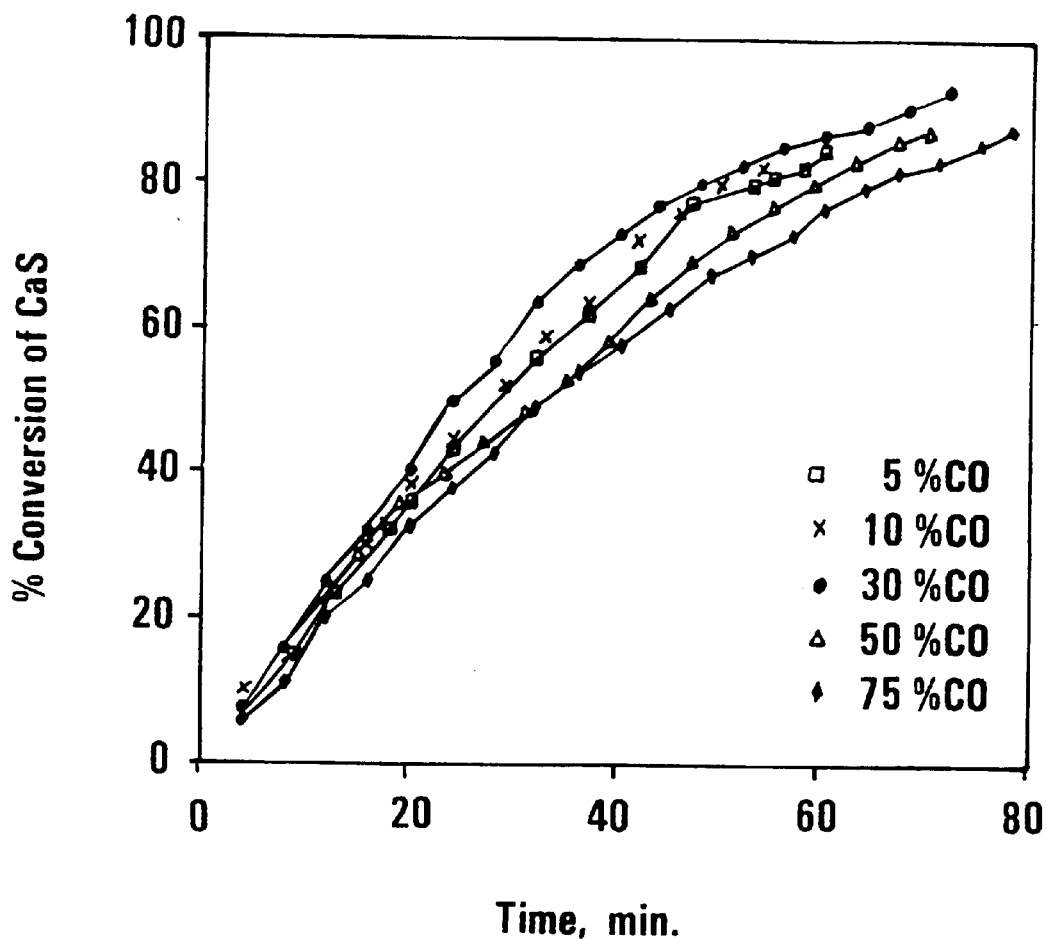
FIG. 4 is a graph of the data obtained in a series of TGA runs in which a pellet of calcium sulfide was treated by the cyclic process at 1050° C. using an oxygen concentration of 10 mole % and various carbon monoxide concentrations.
Figure 5:
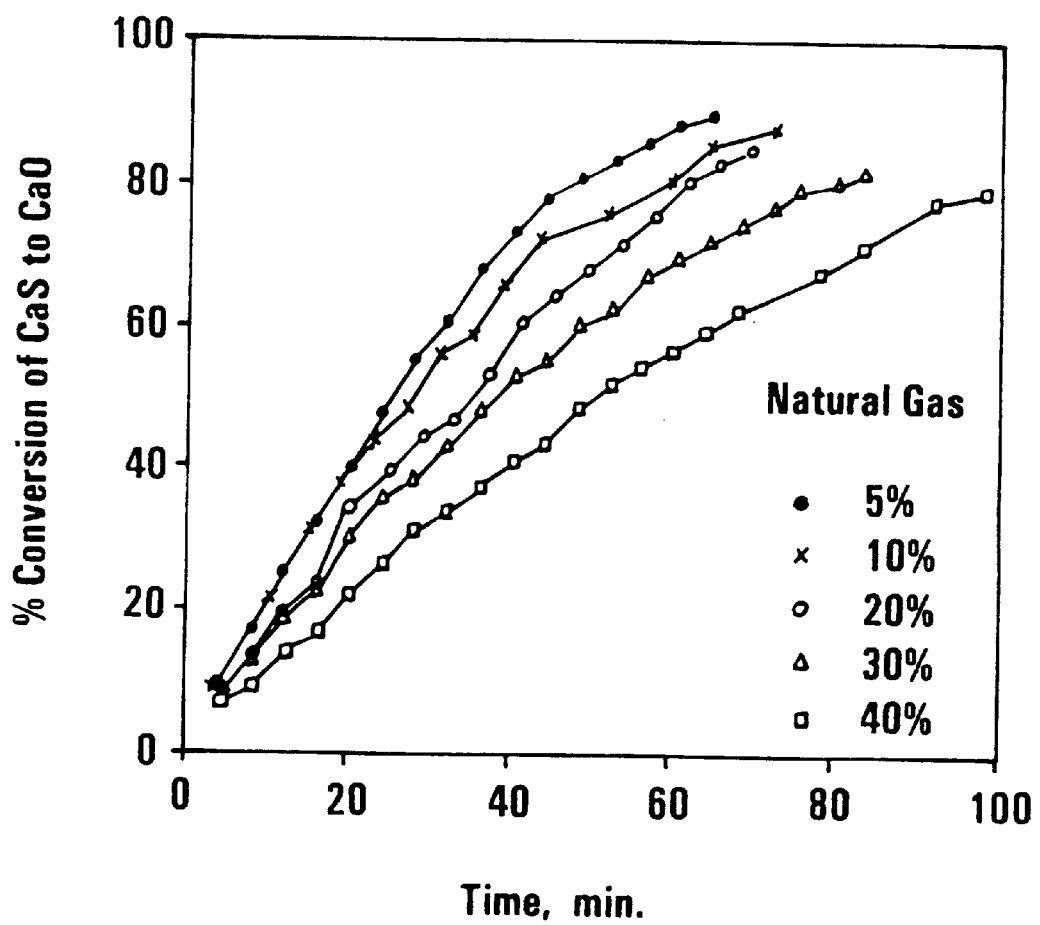
FIG. 5 is a graph of the data obtained in a series of TGA runs in which a pellet of calcium sulfide was treated by the cyclic process at 1050° C. using an oxygen concentration of 10 mole % and various concentrations of natural gas.
Figure 6:
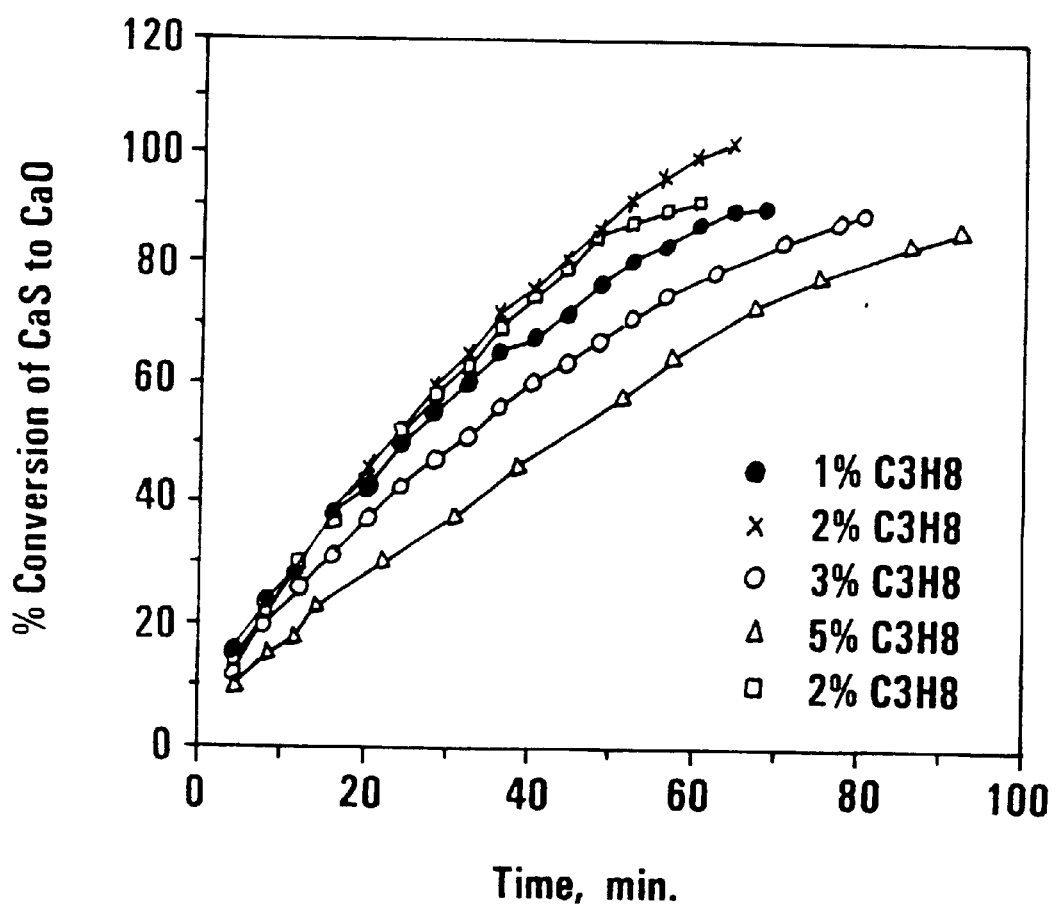
FIG. 6 is a graph of the data obtained in a series of TGA runs in which a pellet of calcium sulfide was treated by the cyclic process at 1050° C. using an oxygen concentration of 10 mole % and various concentrations of propane.

To investigate the effects of reducing gas type and concentration, an oxygen concentration of 10 mole % was employed during the oxidizing phase. The results achieved with carbon monoxide, natural gas, and propane as individual reducing agents are shown in FIGS. 4, 5, and 6, respectively. These results indicate that the maximum rate of conversion was observed when the individual reducing agents were used in the following concentrations: 30 mole % carbon monoxide, 5 mole % natural gas, and 2 mole % propane. These concentrations are in general agreement with the stoichiometric amount of reductant required for the conversion of calcium sulfate into calcium oxide. The most likely explanation for the lower rate of conversion observed when the reducing gas concentration was either smaller or larger than the optimum value is the following: for concentrations less than the optimum value, the rate of conversion of calcium sulfate to calcium oxide was proportional to reactant gas concentration which is normal. For concentrations greater than the optimum value, the rate of conversion of calcium sulfate to calcium oxide was depressed by the simultaneous conversion of part of the calcium sulfate to calcium sulfide.

Figure 7:
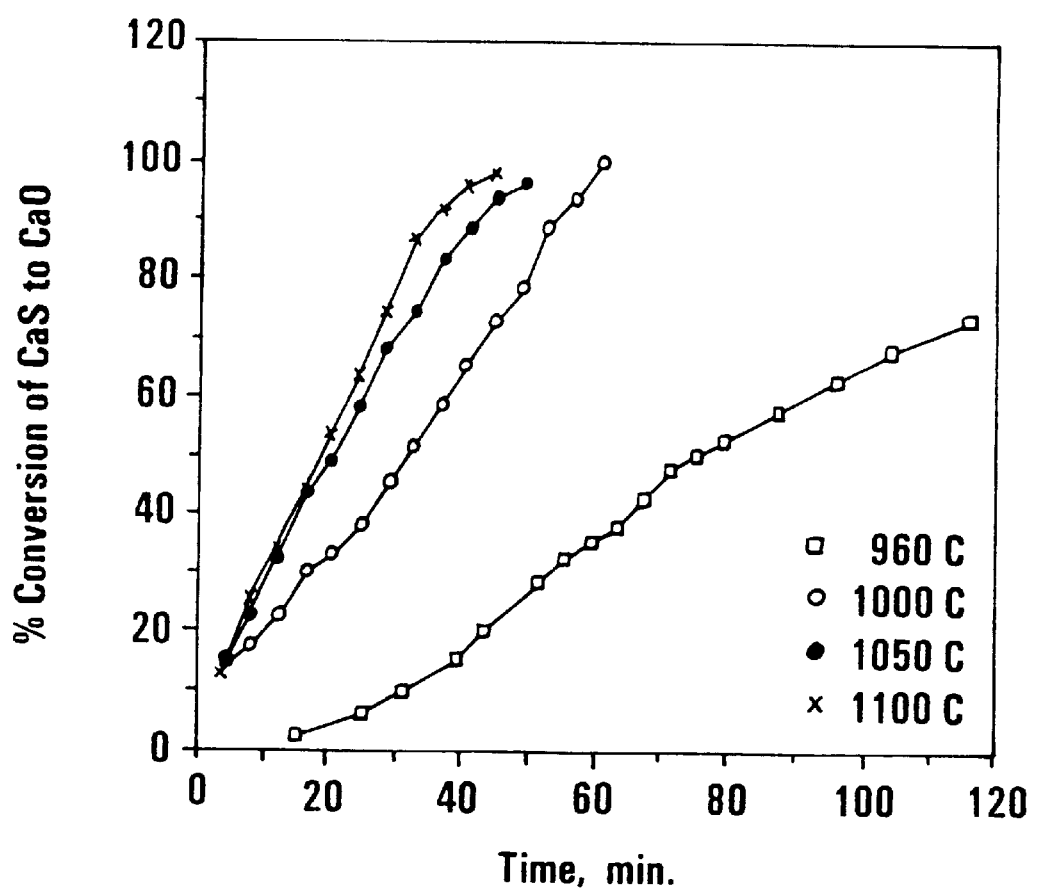
FIG. 7 is a graph of the data obtained in a series of TGA runs in which a pellet of calcium sulfide was treated by the cyclic process with 20 mole % oxygen and 30 mole % carbon monoxide at various temperatures.

For investigating the effect of reaction temperature on the rate of conversion, an oxygen concentration of 20 mole % was employed during the oxidizing phase and a carbon monoxide concentration of 30 mole % was employed during the reducing phase of each cycle. The results of a series of runs made at different temperatures are indicated by FIG. 7. It can be seen that the overall rate of conversion increased with increasing temperature over the range of temperature explored, i.e., from 960 to 1100° C. However, the increase in the rate of reaction between 1050 and 1100° C. was very slight.

EXAMPLE III

In a typical industrial application of the two-zone fluidized bed process of this invention, calcium sulfide particles are converted to calcium oxide particles continuously in a two-zone fluidized bed supplied with air and natural gas and heated to 1000° C. The process is carried out in a reaction system such as portrayed by FIG. 8. Air is introduced through a refractory grid plate at the bottom of the fluidized bed, creating an oxidizing zone in the lower part of the bed. Natural gas is introduced through a second gas distributor which is located in the mid-region of the fluidized bed, creating a reducing zone in the upper part of the bed. Since the natural gas is diluted immediately upon entering the fluidized bed, the reacting particles will not be exposed to excessively high concentrations of reducing gas which can reform calcium sulfide. Because the oxidation of calcium sulfide generates a large amount of heat, water is introduced directly into the fluidized bed to remove part of the heat. Some of the heat is also removed by the endothermic reduction of calcium sulfate to calcium oxide and by heating the various reactants from ambient temperature to the temperature of the fluidized bed. Although water can be introduced almost anywhere in the fluidized bed for the purpose of cooling, it is introduced advantageously through the same distributor used for introducing the reducing gas. In this way a gas distributor made of metal pipe or tubing (e.g., type 446 stainless steel) is employed because its temperature is maintained well below the temperature of the fluidized bed due to the cooling provided by the water as it is heated and converted into steam. Otherwise without the cooling effect of the water, it would be necessary to introduce the reducing gas through a distributor made of refractory materials which can withstand the corrosive effects of the hot, sulfurous gases present in the fluidized bed. These gases are especially corrosive at higher temperatures. Needless to say, a gas distributor made of a refractory material would be much more cumbersome and costly to construct than one made of metal tubing. The gas distributor constructed from metal tubing is in the form of an open grid which does not interfere with particle circulation in the fluidized bed.

Figure 8:
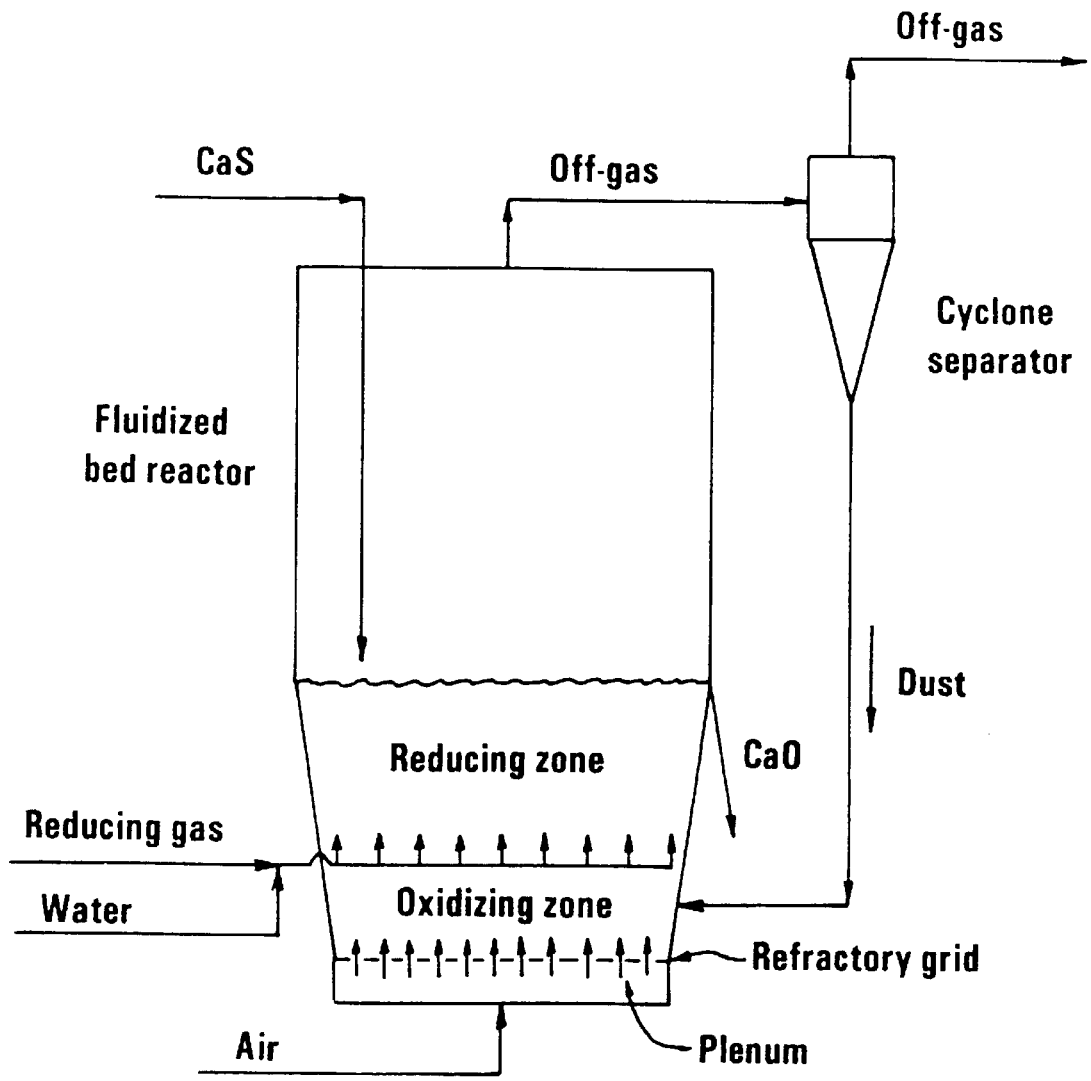
FIG. 8 is a cross-sectional elevational view of a fluidized bed reactor equipped with means for concurrently maintaining a reducing zone above an oxidizing zone within the same fluidized bed.

The calcium sulfide particles are introduced directly into the fluidized bed as indicated in FIG. 8 or alternately into the reactor off-gas stream between the reactor and cyclone separator. If the latter method is employed, the particles are recovered by the cyclone along with dust entrained in reactor off-gas and returned to the reactor. By introducing the particles into the off-gas, some heat is recovered from the off-gas which increases the overall thermal efficiency of the process. Also the particles are subjected to less thermal shock than when they are introduced directly into the fluidized bed. Therefore, particle decrepitation is reduced. While the particles reside in the fluidized bed, they circulate freely between the two zones and are subjected alternately and repeatedly to oxidation and reduction which over time converts them to calcium oxide. The reacted particles are removed subsequently and continuously through an overflow tube.

The walls of the reactor are tapered as indicated in FIG. 8 so that the superficial gas velocity is nearly constant between the top and bottom of the fluidized bed. This design promotes smoother fluidization than one which causes the gas velocity to vary greatly between the top and bottom. Inevitably some of the finer particles are elutriated from the fluidized bed and entrained in the off-gas. The freeboard between the top of the fluidized bed and the top of the reactor vessel is designed by well known methods to minimize particle entrainment in the off-gas. Most of the particles remaining in the off-gas are recovered by the cyclone separator and returned to the reactor.

In operation the reactants are supplied to the fluidized bed in proportions which promote reaction 1 in the oxidizing zone and reactions such as reaction 4 in the reducing zone so that the overall process takes place in accordance with a reaction such as reaction 7. For purposes of illustration it is assumed that natural gas consists largely of methane. Therefore, under ideal conditions 2 moles of oxygen and 0.25 mole of methane are required for the reaction of each mole of calcium sulfide. Consequently, 9.52 moles of air and 0.25 mole methane are supplied to the reactor for each mole of calcium sulfide.

Since reaction 7 generates more heat than is required to maintain a reaction temperature of 1000° C. or more, cooling water is introduced into the fluidized bed. The quantity of cooling water is estimated by simultaneous solution of the material and energy balances for the reaction system. Such an estimate was made based on the following assumptions: reactants and cooling water supplied at 25° C., natural gas consisting of 90 mole % $CH_4$ and 10 mole % $N_2$ utilized, reaction temperature of 1025° C., negligible heat losses, reactants supplied in stoichiometric proportions, feed particles consisting entirely of CaS introduced directly into the fluidized bed, and complete conversion of calcium sulfide to calcium oxide. For these conditions, 3.43 moles of cooling water are required for each mole of calcium sulfide reacted. Consequently, for each mole of calcium sulfide reacted, the following quantities of gaseous products are produced:

|  | moles | mole % |
|---|---|---|
| $SO_2$ | 1.00 | 7.8 |
| $CO_2$ | 0.25 | 2.0 |
| $H_2O$ | 3.93 | 30.9 |
| $N_2$ | 7.55 | 59.3 |
|  | 12.73 | 100.0 |

These results show that the off-gas will contain 7.8 mole % sulfur dioxide which is equivalent to 11.4 mole % on a dry basis. A concentration of this magnitude is suitable for subsequent conversion of sulfur dioxide into sulfuric acid by known methods.

Since the gases leave the fluidized bed reactor at a temperature of 1000° C. or more, they contain sensible heat which can be recovered advantageously by employing a waste heat boiler which generates steam. The steam can be used either for industrial process heating or power generation.

The quicklime produced by this process is virtually free of calcium sulfide and is suitable for various purposes such as the adsorption of sulfurous gases in either coal gasifiers or flue gas desulfurization systems, the stabilization of soils used for road bases, and the production of cement clinker.

EXAMPLE IV

When producer gas made from coal or coke is used in the two-zone fluidized bed process of this invention, only slight modification of the conditions described in Example III is necessary. Based on a typical producer gas consisting of 25.3 mole % CO, 13.2 mole % $H_2$, 5.4 mole % $CO_2$, and 56.1 mole % $N_2$, the simultaneous solution of the material and energy balances around the reaction system shows that for the conversion of one mole of calcium sulfide to calcium oxide at 1025° C. under ideal conditions the following quantities are required: 9.52 moles air, 2.60 moles producer gas, and 3.56 moles cooling water. For each mole of calcium sulfide reacted, the following quantities of gaseous products are produced:

|  | moles | mole % |
|---|---|---|
| $SO_2$ | 1.00 | 6.9 |
| $CO_2$ | 0.66 | 4.5 |
| $H_2O$ | 3.90 | 26.9 |
| $N_2$ | 8.96 | 61.7 |
|  | 14.52 | 100.0 |

These results indicate that the off-gas contains 6.9 mole % sulfur dioxide which is equivalent to 9.4 mole % on a dry basis. While the concentration of sulfur dioxide is slightly lower than noted in Example III, the concentration is still adequate for conversion of sulfur dioxide into sulfuric acid. The quicklime is similar to that produced under the conditions of Example III, and heat can be recovered from the off-gas by employing a waste heat boiler to generate steam.

EXAMPLE V

Figure 9:
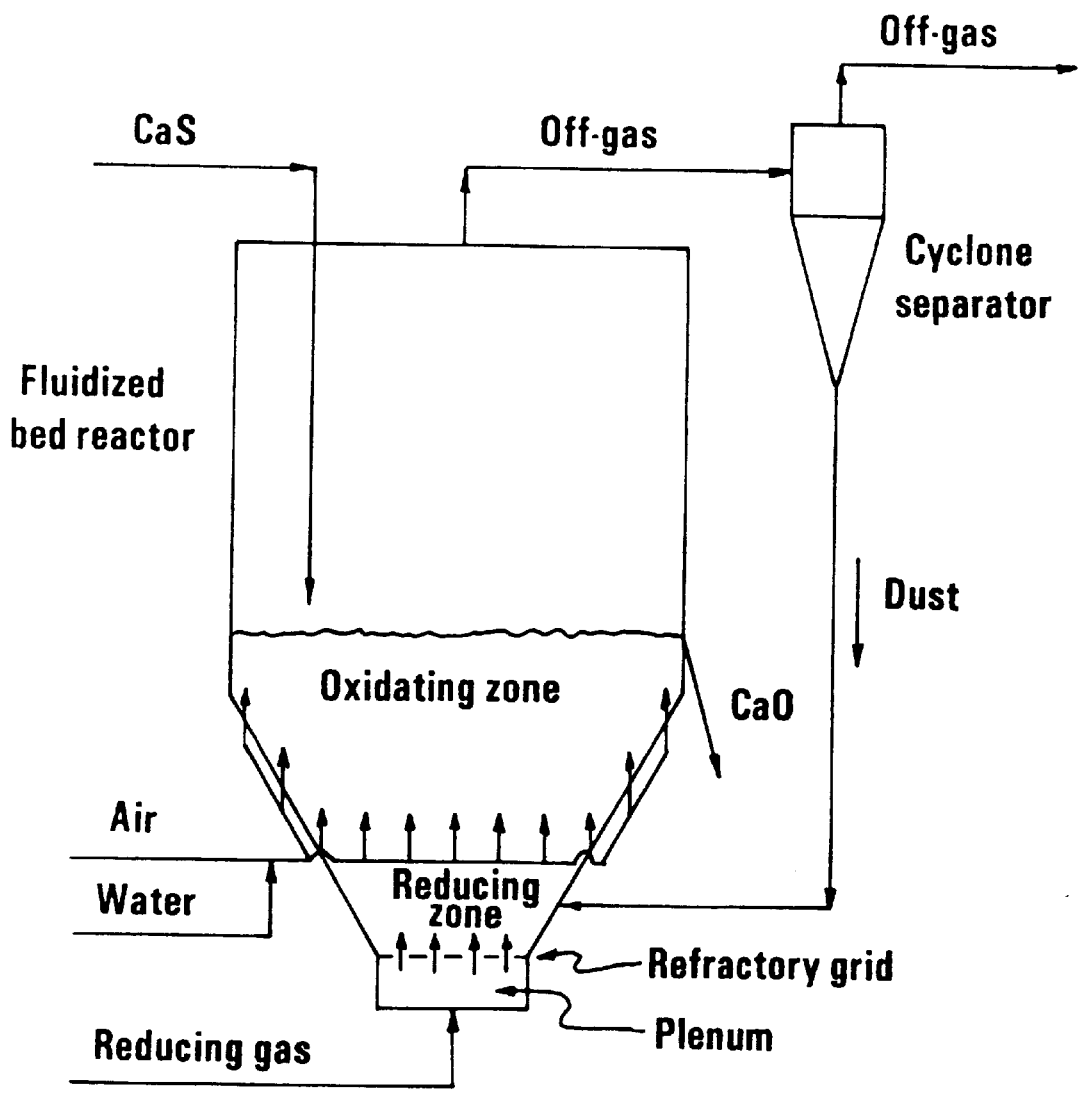
FIG. 9 is a cross-sectional elevational view of a fluidized bed reactor equipped with means for concurrently maintaining an oxidizing zone above a reducing zone within the same fluidized bed.

When a less concentrated reducing agent such as producer gas is available for use in the two-zone fluidized bed process of this invention, an alternative method of practicing the invention is to interchange the oxidizing and reducing zones so that the oxidizing zone is above the reducing zone as indicated in FIG. 9. In this case the reducing gas is introduced through the refractory grid at the bottom of the fluidized bed, and air is introduced at a higher level in the bed through a second gas distributor and also through ports or nozzles located in the sloping sides of the vessel which contains the fluidized bed. Since the volumetric flow rate of the reducing gas is much less than the volumetric flow rate of the oxidizing gas, maintaining a constant superficial gas velocity within the fluidized bed requires that the diameter of the bottom of the bed be much smaller than the diameter of the top of the bed. This requirement is met by sloping the slides of the vessel at an angle of 45° to 60° with the horizontal. To maintain bed fluidization in the region above the sloping sides, air is introduced through ports or nozzles located along the sloping sides. Cooling water is introduced along with air through the upper gas distribution grid within the fluidized bed for the purpose of cooling both the bed and the distributor.

Calcium sulfide particles are introduced into and removed from the fluidized bed as in the previous examples. Also the off-gas is treated in a cyclone separator as before to remove entrained dust.

Interchanging the location of the oxidizing and reducing zones does not affect the material and energy balances for an ideal reaction system as represented by FIGS. 8 and 9. Therefore, when a producer gas and operating conditions such as those described in Example IV are employed with the fluidized bed shown in FIG. 9, the various input requirements are the same as in Example IV. Consequently, the amount and composition of the reactor off-gas are the same as in Example IV. Also the solid product is the same as in the previous examples.

EXAMPLE VI

Figure 10:
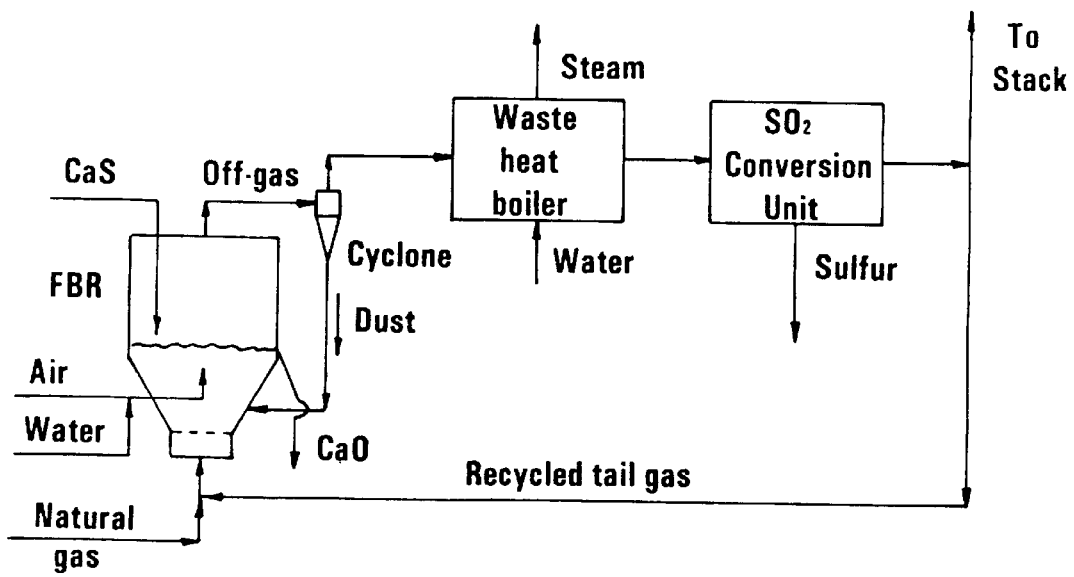
FIG. 10 is a flow sheet for an integrated process which combines a two-zone fluidized bed reactor (FBR) for converting calcium sulfide into calcium oxide and sulfur dioxide with a waste heat boiler for recovering heat from the FBR off-gas and a unit for converting sulfur dioxide in the FBR off-gas into elemental sulfur. A portion of the remaining tail gas is recycled to dilute the natural gas supplied to the FBR.

Utilization of a concentrated reducing agent such as natural gas with a large concentration of methane and possibly other hydrocarbons in the lower zone of the two-zone fluidized bed process exemplified by FIG. 9 requires dilution of the reducing agent with an inert gas such as nitrogen or carbon dioxide. Otherwise calcium sulfate formed in the oxidizing zone will be reduced to calcium sulfide instead of calcium oxide. A possible source of inert gas is the tail gas from an integrated process exemplified by FIG. 10 in which the sulfur dioxide produced from calcium sulfide is converted subsequently to elemental sulfur by a reduction process. After the sulfur is condensed, the remaining gas will be largely nitrogen mixed with a small amount of carbon dioxide. Some of this gas can be recycled and used to dilute the concentrated reducing agent.

To illustrate the application of this invention, natural gas consisting of 90 mole % methane and 10 mole % nitrogen is mixed with recycled gas consisting of 96.8 mole % nitrogen and 3.2 mole % carbon dioxide in such proportions as to provide a reducing gas with the following composition: 10.0 mole % methane, 2.8 mole % carbon dioxide and 87.2 mole % nitrogen. The reducing gas is supplied to the lower zone of the two-zone fluidized bed reactor represented by FIG. 9, and air and cooling water are supplied to the upper zone. Simultaneous solution of the material and energy balances for an ideal case shows that the conversion of each mole of calcium sulfide to calcium oxide requires 2.50 moles of reducing gas, 9.52 moles of air, and 2.56 moles of cooling water. The conversion of each mole of calcium sulfide results in the following quantities being present in the reactor off-gas:

|  | moles | mole % |
|---|---|---|
| $SO_2$ | 1.00 | 7.1 |
| $CO_2$ | 0.32 | 2.3 |
| $H_2O$ | 3.06 | 21.7 |
| $N_2$ | 9.73 | 68.9 |
|  | 14.11 | 100.0 |

These results indicate that the off-gas contains 7.1 mole % sulfur dioxide which is equivalent to 9.0 mole % on a dry basis. Consequently, the results are similar to those shown in the previous examples.

EXAMPLE VII

Figure 11:
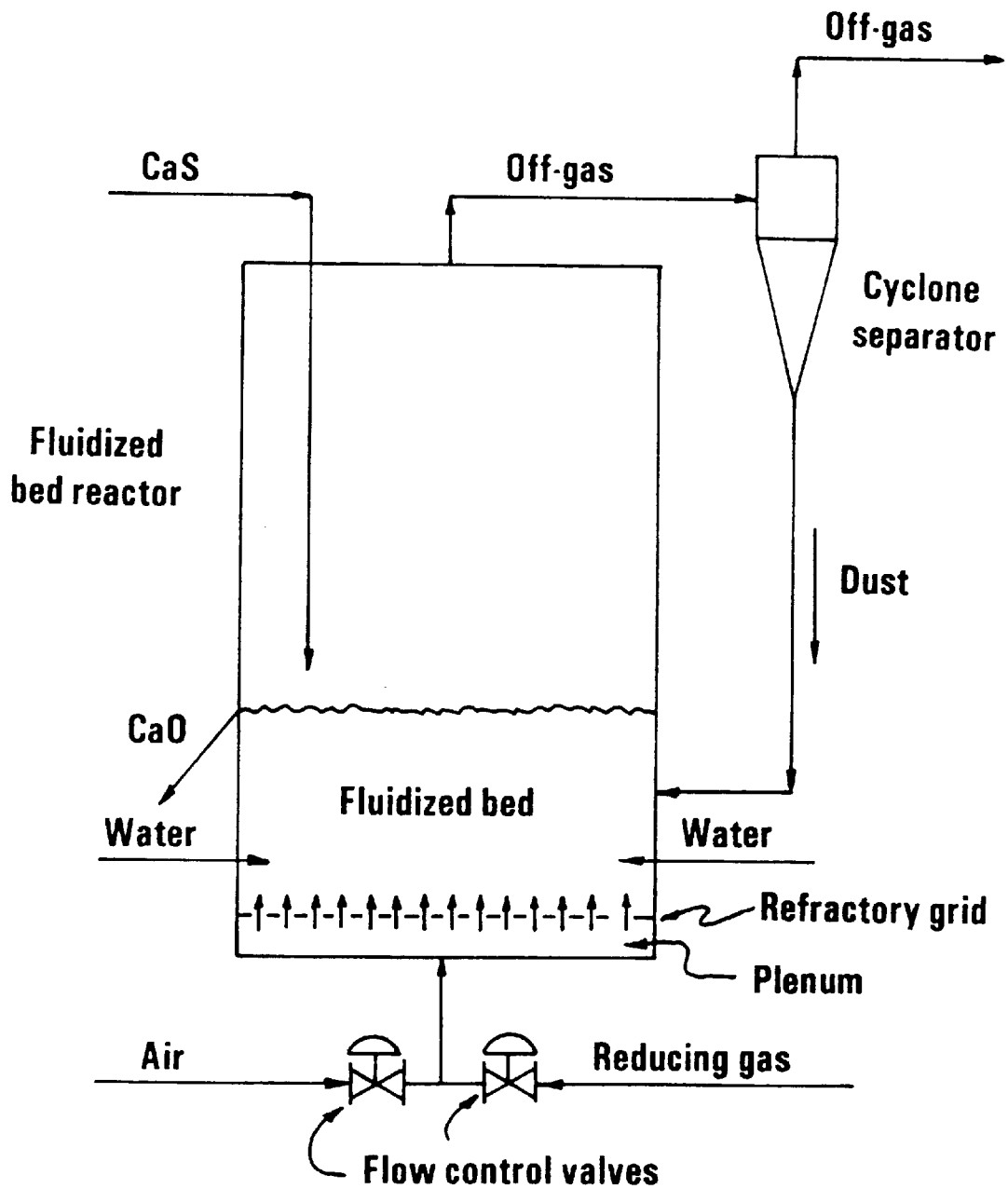
FIG. 11 is a cross-sectional elevational view of fluidized bed reactor equipped with means for continuously cycling the gas supplied to the reactor so that the gas phase present in the reactor varies between oxidizing and reducing states in a periodic manner.

An alternative method of applying the fluidized bed process of this invention is to vary the gas composition of the entire bed in a periodic manner. This is accomplished by varying the composition of the gas supplied through the gas distributor in the bottom of the fluidized bed. The gas composition is varied in a cyclic manner by introducing air during one part of the cycle and a reducing gas during another part of the cycle. Since all of the gaseous reactants are introduced through the bottom distributor plate, the design of the fluidized bed reactor is simpler than for the preceding examples. The cycle time is controlled automatically by a timing device or clock which periodically supplies a signal to open or close valves in the pipelines that supply air and a reducing gas to the fluidized bed reactor as shown in FIG. 11. Either electrically or pneumatically operated control valves can be used. Typically, the cycle time will fall within the range of 1 to 10 min. Generally, the reducing phase of the cycle will be shorter than the oxidizing phase since the process requires less reducing gas than oxidizing gas. Cooling water is also introduced during the oxidizing phase to control the temperature of the fluidized bed. The water can be fed through tuyeres located in the sides of the reactor or through separate nozzles attached to the gas distributor plate at the bottom of the reactor. To maintain a relatively constant superficial gas velocity throughout any given cycle, the volumetric flow rate of air and steam generated by vaporizing cooling water during the oxidizing phase of the cycle will be set equal to the volumetric flow rate of reducing gas during the reducing phase of the cycle. Other features of the fluidized bed reactor will be similar to those described in the previous examples.

When a producer gas having the composition indicated in Example IV is utilized for this process, the overall requirements for producer gas, air, and cooling water are the same as noted in Examples IV and V. In other words, 2.60 moles producer gas, 9.52 moles air, and 3.56 moles cooling water are required for the conversion of each mole of calcium sulfide to calcium oxide. To maintain a constant superficial gas velocity throughout any given cycle, producer gas is introduced during 18% of the cycle and air and cooling water during 82% of the cycle. In this way the oxidizing and reducing agents are also kept in the proportions required for oxidation (reaction 1) and reduction (reactions 2 and 3). While the fluidized bed temperature will fluctuate during each cycle because the oxidation phase is exothermic and the reduction phase is endothermic, an average bed temperature of approximately 1025° C. can be maintained. The composition of the reactor off-gas will also vary during each cycle since most of the sulfur dioxide will appear in the off-gas during the reducing phase. However, the composition of the off-gas averaged over several cycles will be the same as the composition noted in Examples IV and V. The quicklime will be similar in all respects to that produced in the previous examples.

EXAMPLE VIII

The cyclic process of Example VII can be used with a more concentrated reducing gas such as the natural gas described in Example III provided the gas is diluted with an inert gas as in Example VI. The overall inputs of natural gas, air, and cooling water will be the same as in Example VI. Although the reactor off-gas composition will vary within any given cycle, the off-gas composition averaged over several cycles will be the same as that noted for the off-gas in Example VI. The quicklime will be similar in all respects to that produced in the previous examples.

EXAMPLE IX

Figure 12:
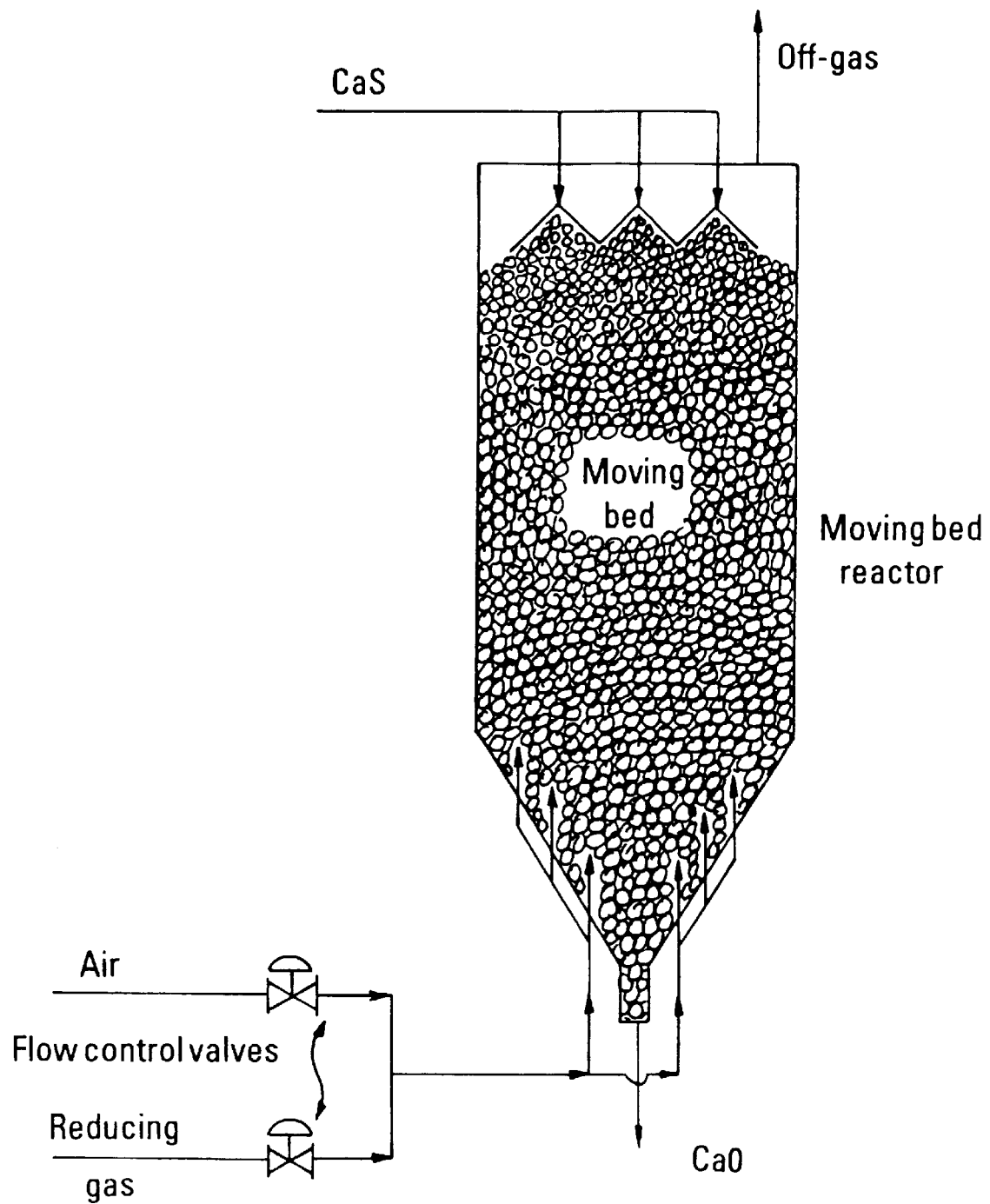
FIG. 12 is a cross-sectional elevational view of a moving bed reactor equipped with means for continuously cycling the gas supplied to the reactor.

Particles which are too large to be treated in a fluidized bed reactor can be treated in either fixed bed or moving bed reactors by the cyclic oxidation/reduction process which converts calcium sulfide to calcium oxide. For example, particles which are 1 to 2 cm in diameter can be treated continuously in a vertical tubular moving bed reactor as indicated in FIG. 12. The reactor may be 0.5 meter or more in diameter and several meters tall. The reactor is filled with particles undergoing treatment as they move downward. Fresh particles are supplied continuously at the top of the reactor and treated particles are removed contiguously from the bottom of the reactor. A gas mixture which is alternately oxidizing and reducing is supplied at the bottom of the reactor. Generally, the gas mixture supplied at the bottom of the reactor is at ambient temperature. As the gas rises through the moving bed of solids, it is heated by contact with the hot particles of calcium oxide. At a particular level in the bed, the gas encounters particles undergoing reaction, and the gas reacts with the particles. The reaction zone will extend over a finite vertical distance. The reacted hot gas continues upward through the upper part of the bed where it can preheat the incoming solids and then leave the reactor somewhat cooled.

Since the overall process generates more heat than is needed to raise the solid and gaseous reactants to reaction temperature, some means must be provided for removing excess heat. In the case of smaller diameter reactors (e.g., diameter <0.5 m), a significant quantity of heat can be lost through the reactor walls. However, the use of larger reactors requires other means of heat removal. A practical means of heat removal is to dilute the gaseous reactants with an inert gas such as the tail gas from an integrated process such as that indicated by FIG. 10. If the inert gas is supplied in sufficient quantity, it can carry away the excess heat and, at the same time, it can serve to dilute a concentrated reducing agent such as natural gas.

To illustrate the application of this invention, a moving bed reactor is supplied alternately with air and natural gas (90 mole % $CH_4$, 10 mole % $N_2$) both being diluted with recycled gas consisting of 96.8 mole % nitrogen and 3.2 mole % carbon dioxide. The gas mixture is supplied at a temperature of 25° C. to the reactor whereas calcium sulfide particles are supplied at a temperature of 1025° C. Since the feed particles are at the reaction temperature, there is no exchange of heat between the gas leaving the reactor and the incoming feed. On the other hand, there is an exchange of heat between the gas entering the reactor and the particles leaving so that the particles are cooled to a temperature near that of the incoming gas. Under these conditions, it is necessary to supply 12.1 moles of recycled gas per mole of calcium sulfide to carry away the excess heat. Although the gas composition varies throughout each oxidation/reducing cycle, the average composition of the gas leaving the reactor over a number of cycles and the number of moles of gas leaving the reactor for each mole of CaS reacted are as follows:

|       | Moles  | mole % |
|-------|--------|--------|
| $SO_2$ | 1.000  | 4.7    |
| $CO_2$ | 0.637  | 3.0    |
| $H_2O$ | 0.5000 | 2.3    |
| $N_2$  | 19.264 | 90.0   |
| Total | 21.401 | 100.0  |

While the concentration of sulfur dioxide (4.7 mole %) is low because of the large amount of gas recycled, this example represents an extreme case where no heat is lost through the reactor walls and feed particles containing 100% calcium sulfide are supplied at the reaction temperature. For other cases where there is either a significant heat loss or the feed is supplied at a lower temperature and possibly containing less than 100% calcium sulfide, the quantity of recycled gas will be lower and the gas leaving the reactor will have a greater concentration of sulfur dioxide.

EXAMPLE X

Figure 13A:
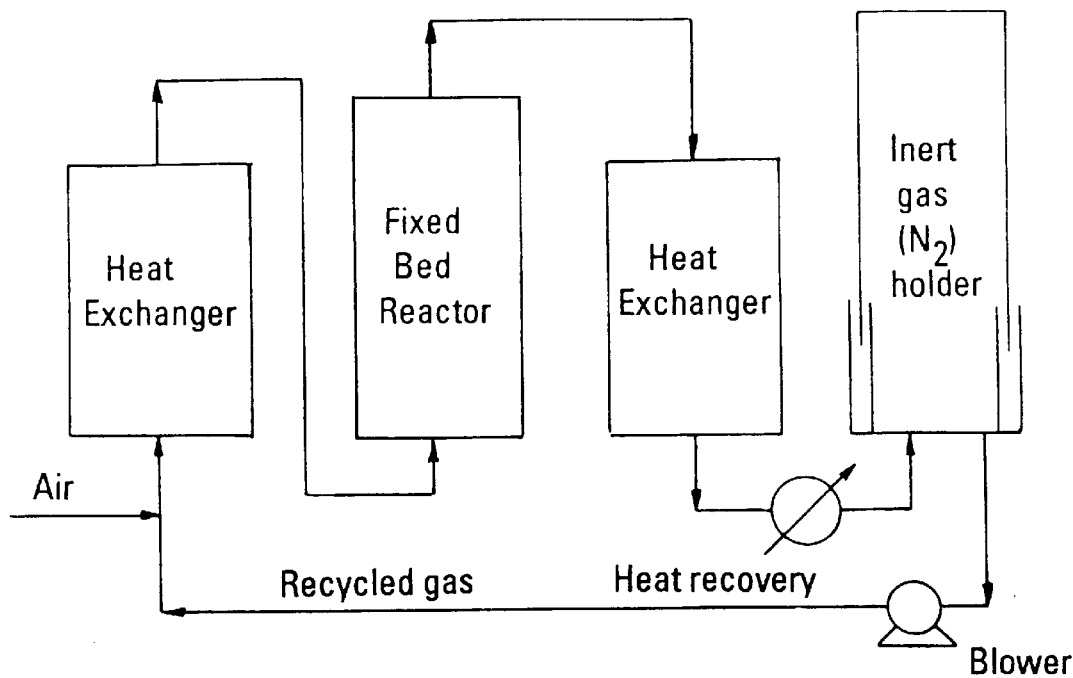
FIG. 13$a$ is a flow sheet showing a fixed bed reactor system during the oxidation phase.

Calcium sulfide containing particles which are too large to be treated in a fluidized bed reactor can be converted to calcium oxide in a fixed bed reactor by employing the cyclic oxidation/reduction process in the manner illustrated by FIG. 13. During the oxidation phase of each cycle, air is combined with recycled inert gas, and the mixture is preheated by passage through a regenerative heat exchanger which could be in the form of an inert pebble bed (see FIG. 13*a*). The hot oxidizing gas is supplied to the fixed bed reactor where it reacts first with the particles at the bottom of the bed, but only a small portion of each particle reacts before the reaction stops due to pore plugging. The reaction front then proceeds layer by layer up the bed. Since the oxidation of calcium sulfide is highly exothermic, the gas temperature and the bed temperature both rise. The rise in temperature is kept in bounds by mixing a considerable quantity of recycled inert gas with the air supplied to the reactor. During the oxidizing phase, most of the oxygen is consumed in converting calcium sulfide into calcium sulfate. Therefore, the hot gas leaving the reactor is largely nitrogen with only traces of oxygen and sulfur dioxide. Much of the sensible heat in the reactor off-gas is recovered by passage through another regenerative heat exchanger. Since not all of the heat produced by oxidation can be utilized in the next phase of the cycle, a second heat exchanger, which could be in the form of a waste heat boiler, is placed after the regenerative heat exchanger. The cooled gas is then stored in an expandable gas holder where it can be drawn on as a source of inert gas during each phase of the oxidation/reduction cycle.

Figure 13B:
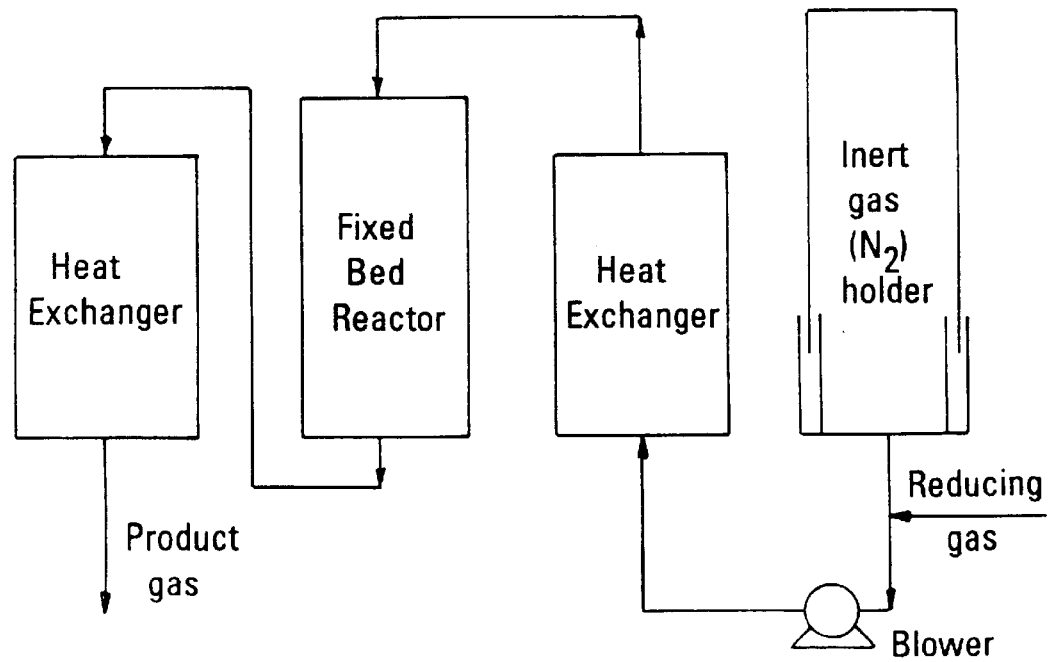

Shortly before the oxidation front reaches the top of the fixed bed reactor, the input of air is stopped and the flow of inert gas through the reactor is reversed. At the same time, a reducing gas such as coal derived producer gas or natural gas is added to the gas stream passing through the reactor as indicated in FIG. 13*b*. The gas mixture is preheated by passage through the regenerative heat exchanger and then begins reacting with the top layer of particles in the fixed bed reactor. The calcium sulfate formed during the preceding phase is converted to calcium oxide and sulfur dioxide. As the calcium sulfate is consumed layer by layer, the reaction front proceeds down the bed. Since the reaction is moderately endothermic, the bed temperature and gas temperature both decrease, but the drop in temperature is moderated by the presence of an appreciable quantity of hot inert gas. During the reducing phase, most of the reducing gas is consumed so that the gas leaving the reactor is largely nitrogen and sulfur dioxide. After the hot gas leaves the bottom of the reactor, it is cooled by passage through the regenerative heat exchanger which is used for preheating the gas supplied during the next phase of the cycle. Shortly before the reducing reaction front reaches the bottom of the reactor, the input of reducing gas is halted and the flow of gas through the reactor is reversed to start another cycle.

This method of treatment is particularly advantageous for the regeneration of large particles which are used as sorbent for $H_2S$ and COS since it does not require that the particles be moved or handled which is likely to cause attrition and breakage of the particles. After the bed has been regenerated, it can be returned to service as a gas adsorber by simply directing the flow of gas to be cleaned through the bed. This method also provides a unique method for removing heat from the system without excessive dilution of the product gas. Consequently, the product gas composition is determined by the stoichiometry of the overall reaction. For the case where natural gas consisting entirely of methane is used as a reducing gas, the required inputs and outputs of the process are determined by overall reaction 7, i.e., 2 moles of oxygen and 0.25 mole of methane are required for each mole of calcium sulfide reacted. Based on the stoichiometry of reaction 7, the product gas will have the following composition:

|     | mole % |
| --- | --- |
| $SO_2$ | 10.8 |
| $CO_2$ | 2.7 |
| $H_2O$ | 5.4 |
| $N_2$ | 81.1 |
|     | 100.0 |

The concentration of sulfur dioxide in the gas is significantly greater than that indicated for the previous examples.

As discussed herein, the present invention is particularly suitable for the treatment of coal gasifier waste which contains calcium sulfide. Such waste is known to contain coal ash, coal char, and unreacted lime in addition to calcium sulfide. The presence of a source of carbon, such as coal char, in this waste can be used to advantage because the amount present will generally be more than sufficient to produce the reducing conditions required for the alternating oxidizing and reducing treatment required to convert the calcium sulfide portion of the waste to calcium oxide. The following examples show how to utilize the coal char for this purpose.

EXAMPLE XI

Figure 14:
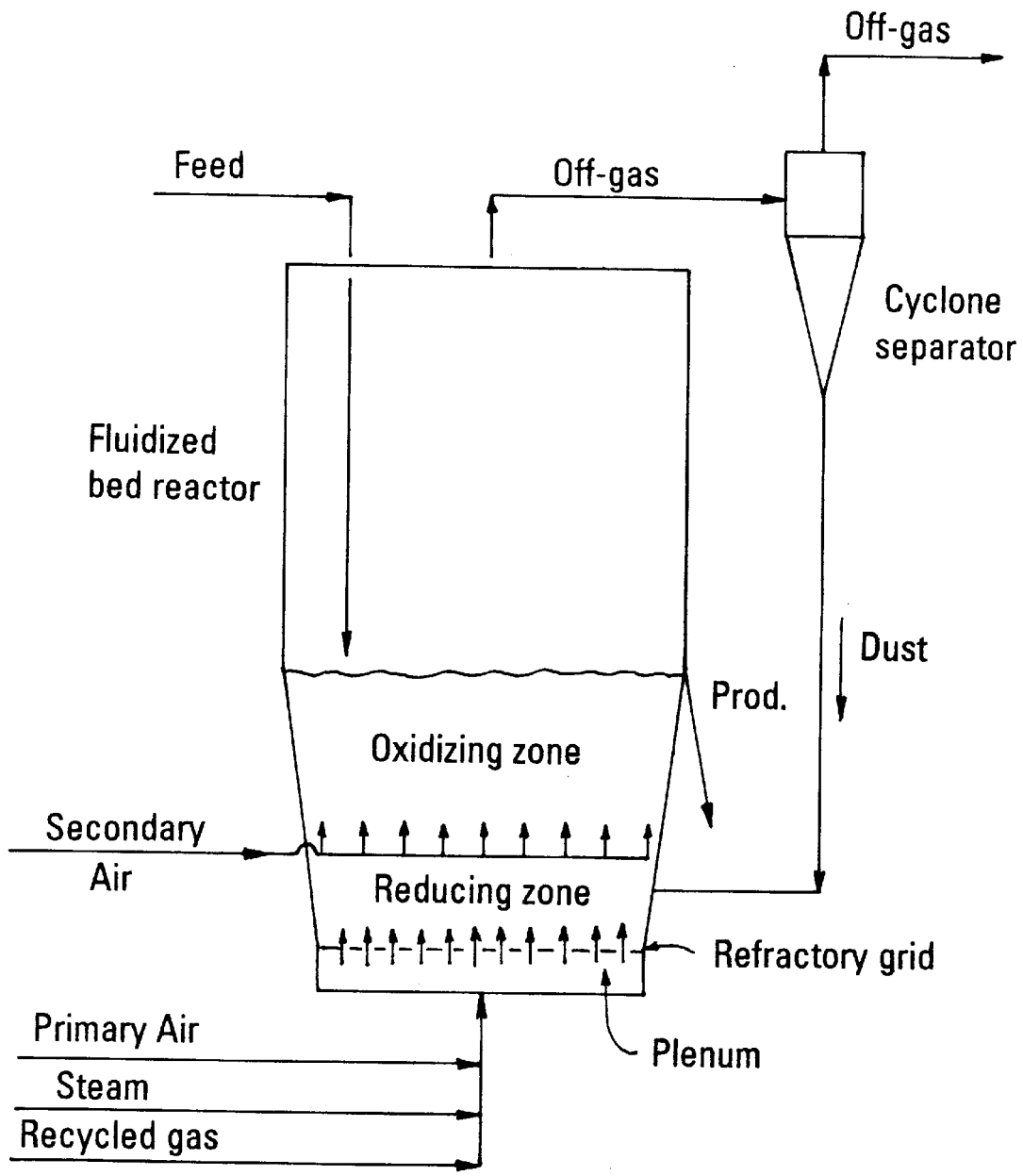
FIG. 14 is a cross-sectional elevational view of a fluidized bed reactor equipped with means for concurrently maintaining an oxidizing zone above a reducing zone within the same fluidized bed where the feed is a mixture of calcium sulfide particles and carbon particles.

Coal gasifier waste produced by treating a mixture of crushed coal and limestone in a bubbling fluidized bed reactor will consist of a mixture of unburned carbon, coal ash, lime, and calcium sulfide particles which typically fall in a size range between 0.2 mm and 5.0 mm. Such material is well suited for further treatment in a two-zone, bubbling, fluidized bed reactor as shown in FIG. 14 in order to eliminate unburned carbon and calcium sulfide. The gasifier waste is supplied at a constant feed rate to the two-zone reactor where the particles are subjected repeatedly to oxidation and reduction as they circulate freely in the fluidized bed which operates within a temperature range of 900 to 1200° C. As the particles pass through the oxidizing zone, a small portion of each particle containing CaS is converted to $CaSO_4$ by the following reaction:

$$CaS+2O_2=CaSO_4$$

Then as the particles continue on through the reducing zone, the $CaSO_4$ reacts to form CaO and $SO_2$ by means of reactions such as the following:

$$CaSO_4+CO=CaO+CO_2+SO_2$$

$$CaSO_4+H_2=CaO+H_2O+SO_2$$

After the particles have passed repeatedly through both zones, the CaS is converted almost completely to CaO. By providing an average particle residence time of 1 hr to 2 hr in the reactor, the calcium-containing particles are largely converted to CaO as they leave the reactor.

Figure 15:
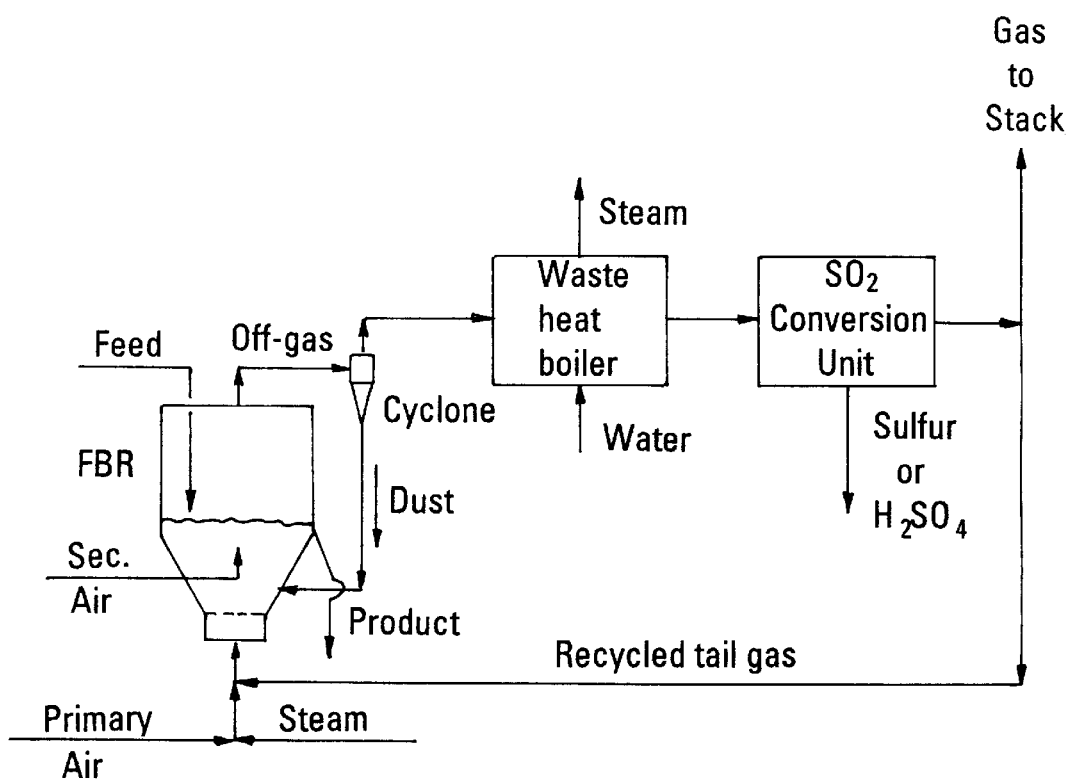
FIG. 15 is a flow sheet for an integrated process which combines (1) a two-zone fluidized bed reactor (FBR) for converting calcium sulfide mixed with other coal gasifier waste into calcium oxide and sulfur dioxide, (2) a waste heat boiler for recovering heat form the FBR off-gas, and (3) a unit for converting sulfur dioxide in the FBR off-gas into either elemental sulfur or sulfuric acid. A portion of the remaining tail gas is recycled to dilute the primary air supplied to the FBR.

The typical coal gasifier waste will contain sufficient unburned carbon to provide for the reducing conditions in the lower zone of the fluidized bed. This zone is supplied with a limited amount of primary air diluted with steam and/or recycled, inert tail gas through a gas distributor in the bottom of the fluidized bed. The tail gas is recovered when the fluidized bed reactor (FBR) off-gas is processed downstream to remove $SO_2$ as indicated in FIG. 15. Because of the limited supply and concentration of oxygen in the reducing zone, some of the carbon is converted to CO by the well known reaction, $$C+\tfrac{1}{2}O_2=CO$$

In addition, some carbon reacts with steam to produce both CO and $H_2$ as indicated below.

$$C+H_2O=CO+H_2$$

These reactions produce the CO and $H_2$ required to decompose the $CaSO_4$ so that in most cases it is not necessary to introduce additional fuel gas.

To create the oxidizing conditions required in the upper zone of the fluidized bed, excess secondary air is introduced through a second gas distributor located in the middle of the bed. More than enough oxygen is supplied to oxidize the CaS and unburned carbon in the reactor feed. As the particles circulate through the upper zone, some but not all of the carbon is converted to $CO_2$ in each pass through the zone by the reaction, $$C+O_2=CO_2$$

Also any CO or $H_2$ not consumed in the lower reducing zone is converted to $CO_2$ and $H_2O$ in the oxidizing zone. Therefore, the gas leaving the upper zone and the reactor is a mixture of $N_2$, $CO_2$, $H_2O$, $SO_2$, and $O_2$. Furthermore, the solids discharged from the reactor are largely free of CaS and unburned carbon.

Depending on the concentration of $SO_2$ in the reactor off-gas, the off-gas can be treated by well known methods to produce either elemental sulfur or sulfuric acid. Alternatively, the $SO_2$ can be reacted in a second fluidized bed reactor with the solids which have been treated in the first fluidized bed reactor to produce $CaSO_4$ for disposal.

Although the overall process which takes place in the first fluidized bed reactor is exothermic, the excess heat generated is largely balanced by the heat required to raise the temperature of the reactants to the operating temperature and by heat loss through the reactor walls. Additional heat can be removed by water cooling the reactor walls to maintain the required operating temperature.

EXAMPLE XII

Figure 16:
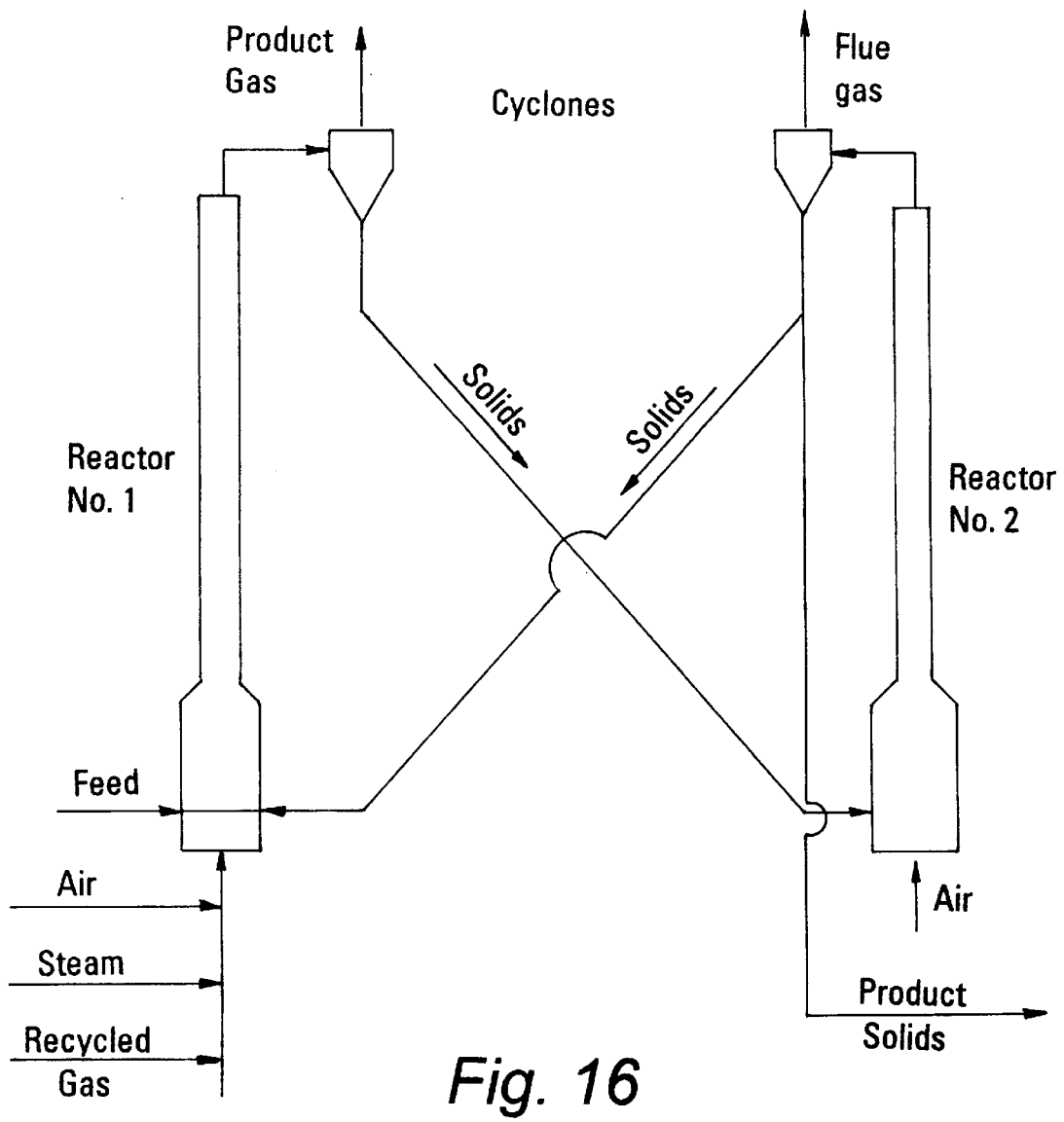
FIG. 16 is a cross-sectional elevational view of a two reactor system in which reducing conditions are maintained in the first reactor and oxidizing conditions are maintained in the second reactor. Solids are transported upward through each reactor by a flowing stream of gas. Solids which leave the second reactor are recycled back to the first reactor.

At least one other type of advanced coal gasification process employs a transport reactor in which a mixture of fine-size coal particles and limestone particles are suspended in a mixture of air and steam under pressure for gasification at 870° C. [13]. The waste solids from such a reactor will be a mixture of unburned carbon, coal ash, lime, and calcium sulfide particles that typically are smaller than 0.3 mm in size. To eliminate the unburned carbon and calcium sulfide from such material for disposal, repeated oxidation and reduction can be employed using the reaction system shown in FIG. 16. This system consists either of two transport reactors or two circulating fluidized bed reactors in series. Such reactors are well suited for treating finer size particles.

The waste solids are introduced into the bottom of the first reactor. Reducing conditions are maintained in the first reactor by limiting the supply of air. The reactor is supplied with a substoichiometric amount of air relative to the amount of carbon in the feed. Therefore, only a portion of the carbon is oxidized to produce CO by the aforementioned reaction, $$C+\tfrac{1}{2}O_2=CO$$

The air supplied to the reactor can be diluted with steam and/or recycled, inert tail gas obtained as shown previously in FIG. 15. Steam supplied to the reactor will react with carbon to produce CO and $H_2$. The CaS and other solids in the feed pass through the first reactor largely unaffected. These materials together with the remaining unburned carbon are transported upward through the reactor by the flowing stream of gas. The mixture of solids and gas which leaves the top of the first reactor is separated by a cyclone separator, and the solids are introduced into the bottom of the second reactor. Oxidizing conditions are maintained in the second reactor by supplying the reactor with excess air. A portion of each particle containing CaS is converted to $CaSO_4$ by the aforementioned reaction, $$CaS + 2O_2 = CaSO_4$$

Also, a considerable portion of each particle containing unburned carbon is converted to $CO_2$ by the reaction, $$C + O_2 = CO_2$$

Other solid materials such as coal ash and lime are largely unaffected as the solid particles are transported upward through the second reactor by the flowing stream of gas. The mixture of gas and solids which leaves the top of the second reactor is separated by a cyclone separator, and most of the solids are reintroduced into the bottom of the first reactor where they become mixed with fresh feed. As particles containing $CaSO_4$ produced in the second reactor pass upward through the first reactor, the $CaSO_4$ is decomposed by reactions such as the following:

$$CaSO_4 + CO = CaO + CO_2 + SO_2$$

$$CaSO_4 + H_2 = CaO + H_2O + SO_2$$

The CaO produced by these reactions together with other solids are recovered from the reactor off-gas and are reintroduced into the bottom of the second reactor.

After the particles have passed around the two-reactor loop several times, most particles which are composed entirely of CaS at the outset are converted almost completely to CaO. A stream of reacted product is removed from the system at a constant rate. Since the feed is also supplied at a constant rate, the circulating load of material in the system will remain constant under steady state conditions.

The stream of gas recovered from the first reactor will contain $SO_2$ in sufficient concentration to be utilized for the production of elemental sulfur or sulfuric acid. It will also contain $N_2$, $CO_2$ and a small amount of CO. In addition, it will contain $H_2O$ and a small amount of $H_2$ if steam is supplied to the reactor.

The stream of gas recovered from the second reactor will contain $N_2$, $CO_2$, and $O_2$. It may also contain a trace amount of $SO_2$.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

APPENDIX

[1] Clean Coal Technology Demonstration Program (Program Update 1995), DOE/FE-0346, April 1996, U.S. Department of Energy, Assistant Secretary for Fossil Energy, Washington, D.C. 20585.

[2] J. Abbasian, A. Rehmat, and D. D. Banerjee, "Sulfation of Partially Sulfided Calcium-Based Sorbents," *Ind. Eng. Chem. Res.*, 30, 1990–1994 (1991).

[3] D. C. Lynch and J. F. Elliott, "Analysis of the Oxidation Reactions of CaS," *Metallurgical Transactions B*, 11B, 415–425 (1980).

[4] R. J. Torres-Ordonez, J. P. Longwell, and A. F. Sarofim, "Intrinsic Kinetics of CaS(s) Oxidation," *Energy & Fuels*, 3, 506–515 (1989).

[5] D. C. Lynch and J. F. Elliott, "Kinetics of the Oxidation of CaS," *Metallurgical Transactions B*, 9B, 691–704 (1978).

[6] G. Moss, "Converting Calcium Sulphide to Calcium Oxide," U.S. Pat. No. 4,216,197, Aug. 5, 1980.

[7] G. Moss, "Integrated Process for Converting Sulfur-Containing Fuels to Low Sulfur Combustible Gas," U.S. Pat. No. 4,255,162, Mar. 10, 1981.

[8] Tracy Power Station-Unit No. 4, Piñon Pine Power Project, Public Design Report (Topical Report), DOE/MC/29309-4056, December 1994, Sierra Pacific Power Co., Reno, Nev.

[9] C. E. Morris, T. D. Wheelock, and L. L. Smith, "Processing Waste Gypsum in a Two-Zone Fluidized Bed Reactor," in: *New Developments in Fluidization and Fluid-Particle Systems*, Wen-ching Yang (ed.), American Institute of Chemical Engineers, New York, 1987, pp. 94–104.

[10] T. D. Wheelock and T. Riel, "Cyclic Operation of a Fluidized Bed Reactor for Decomposing Calcium Sulfate," *Chemical Engineering Communications*, 109, 155–166 (1991).

[11] T. D. Wheelock, "Simultaneous Reductive and Oxidative Decomposition of Calcium Sulfate in the Same Fluidized Bed," U.S. Pat. No. 4,102,989, Jul. 25, 1978.

[12] T. D. Wheelock, "Cyclical Reductive and Oxidative Decomposition of Calcium Sulfate in Two-stage Fluidized Bed Reactor," Australian Patent No. 618307, Jul. 5, 1989

[13] T. E. Pinkston, J. D. Maxwell, R. F. Leonard and P. Vimalchad, The Power Systems Development Facility-Current Status, EPRI Conference on New Power Generation Technology, San Francisco, Calif., Oct. 25–27, 1995.

What is claimed is:

1. A process for oxidizing calcium sulfide, said process comprising the steps of:

exposing particles contained in waste solids produced by coal gasification comprising calcium sulfide and a source of carbon in a fluidized bed reactor having an upper part, a lower part, a middle part, and a bottom, to a treatment cycle conducted at a temperature within a temperature range greater than 900° C. by circulating said particles freely between the lower part of the fluidized bed reactor maintained in a reducing state and the upper part of the fluidized bed reactor maintained in an oxidizing state so that said particles are treated repeatedly to oxidation and reduction;

creating reducing conditions of said reducing state in the lower part of the fluidized bed reactor by supplying oxygen in a fluidizing gas to the bottom of the fluidized bed reactor in an amount less than 50% of the stoichiometric amount required for complete combustion of the carbon in feed particles comprising calcium sulfide and carbon, wherein incomplete combustion of the carbon supplies carbon monoxide and hydrogen reducing gases, and wherein the concentration of oxygen in said fluidizing gas is less than 10 volume %; and creating oxidizing conditions of said oxidizing state in the upper part of the fluidized bed by introducing additional air in the middle of the fluidized bed in an amount such that oxygen supplied to the fluidized bed reactor exceeds the sum of a stoichiometric amount required for complete combustion of the carbon in the feed particles and a stoichiometric amount required for complete conversion of calcium sulfide to calcium oxide and sulfur dioxide.

2. The process of claim 1, wherein said waste solids comprise carbonaceous particles.

3. The process of claim 2, wherein said particles comprise coal char.

4. The process of claim 1, wherein said particles comprise at least one member selected from the group consisting of coal ash and unreacted lime.

5. The process of claim 1, wherein said particles comprise calcium sulfide, coal char, coal ash, and unreacted lime.

6. The process of claim 1, wherein said particles comprise a particle mixture comprising calcium sulfide particles and carbon particles.

7. The process of claim 1 wherein said fluidizing gas supplied to the bottom of the fluidized bed reactor comprises a mixture of air and steam.

8. The process of claim 1 wherein said fluidizing gas supplied to the bottom of the fluidized bed reactor comprises a mixture of air and recycled reactor off-gas after the off-gas has been treated to remove sulfur dioxide.

9. The process of claim 1, wherein said fluidized bed reactor comprises a two-zone fluidized bed reactor.

10. The process of claim 1, wherein said particles have a size of less than about 6.0 mm.

11. The process of claim 1, wherein said particles having a size within the range of about 0.1 mm to about 5.0 mm.

12. The process of claim 1, wherein said temperature is within a range of about 900° C. to about 1200° C.

13. A process for oxidizing calcium sulfide, said process comprising the steps of:

exposing particles contained in waste solids produced by coal gasification comprising calcium sulfide and carbon to a treatment cycle conducted at a temperature of at least 900° C. in a reaction system comprising a first chemical reactor and a second chemical reactor in series, wherein the first chemical reactor is maintained in a reducing state and the second chemical reactor is maintained in an oxidizing state by introducing feed particles comprising calcium sulfide and carbon into the first chemical reactor and, after treatment in the first chemical reactor, passing treated particles to the second chemical reactor and, after treatment in the second chemical reactor, returning subsequently treated particles to the first reactor for further treatment; and repeating said treatment cycle at least two times before the particles are removed from the reaction system;

creating reducing conditions in the first chemical reactor by supplying the first chemical reactor with air in such an amount that oxygen is supplied in a quantity of less than 50% of a stoichiometric amount required for complete combustion of the carbon in the feed particles, wherein incomplete combustion of the carbon supplies carbon monoxide and hydrogen reducing gases; and creating oxidizing conditions in the second chemical reactor by supplying the second chemical reactor with air such that a sum of oxygen supplied to the first chemical reactor and oxygen supplied to the second chemical reactor exceeds both a stoichiometric amount of oxygen required for complete oxidation of the carbon in the feed particles and a stoichiometric amount of oxygen for complete conversion of calcium sulfide in the feed particles to calcium oxide and sulfur dioxide.

14. The process of claim 13, wherein said particles comprise carbonaceous particles.

15. The process of claim 14, wherein said carbonaceous particles comprise coal char.

16. The process of claim 13, wherein said particles comprise at least one member selected from the group consisting of coal ash and unreacted lime.

17. The process of claim 13, wherein said particles comprise calcium sulfide, coal char, coal ash, and unreacted lime.

18. The process of claim 13, wherein said particles comprise a particle mixture comprising calcium sulfide particles and carbon particles.

19. The process of claim 13, wherein the reaction system comprises two transport reactors in series, wherein said first chemical reactor comprises a first transport reactor and said second chemical reactor comprises a second transport reactor.

20. The process of claim 13, wherein the reaction system comprises two circulating fluidized bed reactors in series, wherein said first chemical reactor comprises a first circulating fluidized bed reactor, and said second chemical reactor comprises a second circulating fluidized bed reactor.

21. The process of claim 13, wherein said particles have a size of less than about 1.0 mm.

22. The process of claim 13, wherein said particles having a size within the range of about 0.02 mm to about 0.5 mm.

23. The process of claim 13, wherein said temperature is within a range of about 900° C. to about 1200° C.

* * * * *

UNITED STATES PATENT AND TRADEMARK OFFICE
CERTIFICATE OF CORRECTION

PATENT NO.   : 6,083,862
DATED        : July 4, 2000
INVENTOR(S)  : Thomas D. Wheelock It is certified that error appears in the above-identified patent and that said Letters Patent is hereby corrected as shown below:

In the Drawings:
Figure 9, delete the word "Oxidating" and insert --Oxidizing--.

In the Specification:

Column 3,
Line 30, delete "can not" and insert --cannot--.
Line 54, delete "lest" and insert --least--.

Column 5,
Line 1, delete "$CaS+2O_2+CO=CaO_2+SO_2$" and insert --$CaS+2O_2+CO=CaO+CO_2+SO_2$--.
Line 2, delete "$CaS+2O_2+H_2=CaO_2+H_2O+SO_2$" and insert --$CaS+2O_2+H_2=CaO+H_2O+SO_2$--.

Column 7,
Line 38, delete "form" and insert --from--.

Column 18,
Line 55, delete "contiguously" and insert --continuously--.

UNITED STATES PATENT AND TRADEMARK OFFICE
CERTIFICATE OF CORRECTION

PATENT NO.   : 6,083,862
DATED        : July 4, 2000
INVENTOR(S)  : Thomas D. Wheelock It is certified that error appears in the above-identified patent and that said Letters Patent is hereby corrected as shown below:

Column 22,
Line 32, delete "first".
Line 38, after the word "walls", insert --and by recycling inert tail gas--.

Signed and Sealed this

Nineteenth Day of June, 2001

*Attest:*

*Nicholas P. Godici*

*Attesting Officer*

NICHOLAS P. GODICI
*Acting Director of the United States Patent and Trademark Office*